United States Patent
Kelley et al.

(10) Patent No.: US 10,389,705 B2
(45) Date of Patent: *Aug. 20, 2019

(54) ASSOCIATING USER ACCOUNTS WITH ENTERPRISE WORKSPACES

(71) Applicant: AirWatch LLC, Atlanta, GA (US)

(72) Inventors: Scott Harlow Kelley, Atlanta, GA (US); Adarsh Subhash Chandra Jain, Atlanta, GA (US); Stephen Turner, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 47 days.

This patent is subject to a terminal disclaimer.

(21) Appl. No.: 15/085,400

(22) Filed: Mar. 30, 2016

(65) Prior Publication Data

US 2017/0289128 A1 Oct. 5, 2017

(51) Int. Cl.
*H04L 29/06* (2006.01)
*H04L 29/08* (2006.01)

(52) U.S. Cl.
CPC ........ *H04L 63/083* (2013.01); *H04L 63/1433* (2013.01); *H04L 67/306* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,668,831 | B2* | 2/2010 | DeRobertis | G06F 21/31 707/783 |
| 8,621,021 | B2* | 12/2013 | Provo | H04L 51/38 709/206 |
| 9,286,471 | B2* | 3/2016 | Qureshi | G06F 21/10 |
| 9,298,355 | B1 | 3/2016 | Beausoleil et al. | |
| 9,692,748 | B2* | 6/2017 | Maheshwari | G06F 8/60 |
| 9,998,446 | B2* | 6/2018 | Branden | H04L 63/0807 |
| 2005/0102377 | A1 | 5/2005 | King et al. | |
| 2010/0024036 | A1 | 1/2010 | Morozov et al. | |
| 2011/0271196 | A1* | 11/2011 | Rakowski | H04L 51/00 715/735 |
| 2012/0005746 | A1 | 1/2012 | Wei et al. | |
| 2013/0091171 | A1* | 4/2013 | Lee | G06F 21/41 707/784 |

(Continued)

OTHER PUBLICATIONS

International Search Report dated Jun. 27, 2017 for Application No. PCT/US2017/024608.

(Continued)

*Primary Examiner* — Farid Homayounmehr
*Assistant Examiner* — Olanrewaju J. Bucknor
(74) *Attorney, Agent, or Firm* — Thomas | Horstemeyer, LLP

(57) ABSTRACT

Various examples relate to the configuration of enterprise workspaces that can be provided in computing devices. In some examples, a computing device is enrolled with a management service that controls operation of at least a portion of the computing device. A management component creates a user account with a distributor of the operating system based on an email address. The management component requests an authentication service to authenticate a user. The user account is associated with an enterprise workspace of the computing device.

20 Claims, 17 Drawing Sheets

(56) References Cited

U.S. PATENT DOCUMENTS

| | | | | |
|---|---|---|---|---|
| 2013/0219176 A1* | 8/2013 | Akella | ............... | H04L 63/0815 |
| | | | | 713/165 |
| 2013/0239192 A1* | 9/2013 | Linga | ..................... | G06F 21/44 |
| | | | | 726/7 |
| 2014/0007193 A1* | 1/2014 | Qureshi | ................. | G06F 21/10 |
| | | | | 726/3 |
| 2014/0019559 A1* | 1/2014 | Schultz | .............. | G06Q 10/107 |
| | | | | 709/206 |
| 2014/0059642 A1* | 2/2014 | Deasy | .................... | G06F 21/53 |
| | | | | 726/1 |
| 2014/0282821 A1* | 9/2014 | Adler | ..................... | H04L 63/10 |
| | | | | 726/1 |
| 2014/0344420 A1* | 11/2014 | Rjeili | ..................... | H04L 43/04 |
| | | | | 709/220 |
| 2014/0344446 A1* | 11/2014 | Rjeili | ..................... | H04L 43/04 |
| | | | | 709/224 |
| 2015/0082371 A1 | 3/2015 | DeWeese et al. | | |
| 2016/0065555 A1* | 3/2016 | Branden | ............ | H04L 63/0807 |
| | | | | 726/7 |
| 2016/0087955 A1* | 3/2016 | Mohamad Abdul | ...... | G06F 8/60 |
| | | | | 726/7 |
| 2016/0088026 A1* | 3/2016 | Mohamad Abdul | ...... | G06F 8/60 |
| | | | | 726/1 |
| 2016/0191567 A1* | 6/2016 | Chahal | ................. | H04W 12/00 |
| | | | | 726/1 |
| 2016/0381080 A1* | 12/2016 | Reddem | ............. | H04L 63/0884 |
| | | | | 726/1 |

OTHER PUBLICATIONS

Office Action dated Jun. 6, 2018 for U.S. Appl. No. 15/085,400.
European Search Report dated Apr. 11, 2019 for Application No. PCT/US2017024608.

* cited by examiner

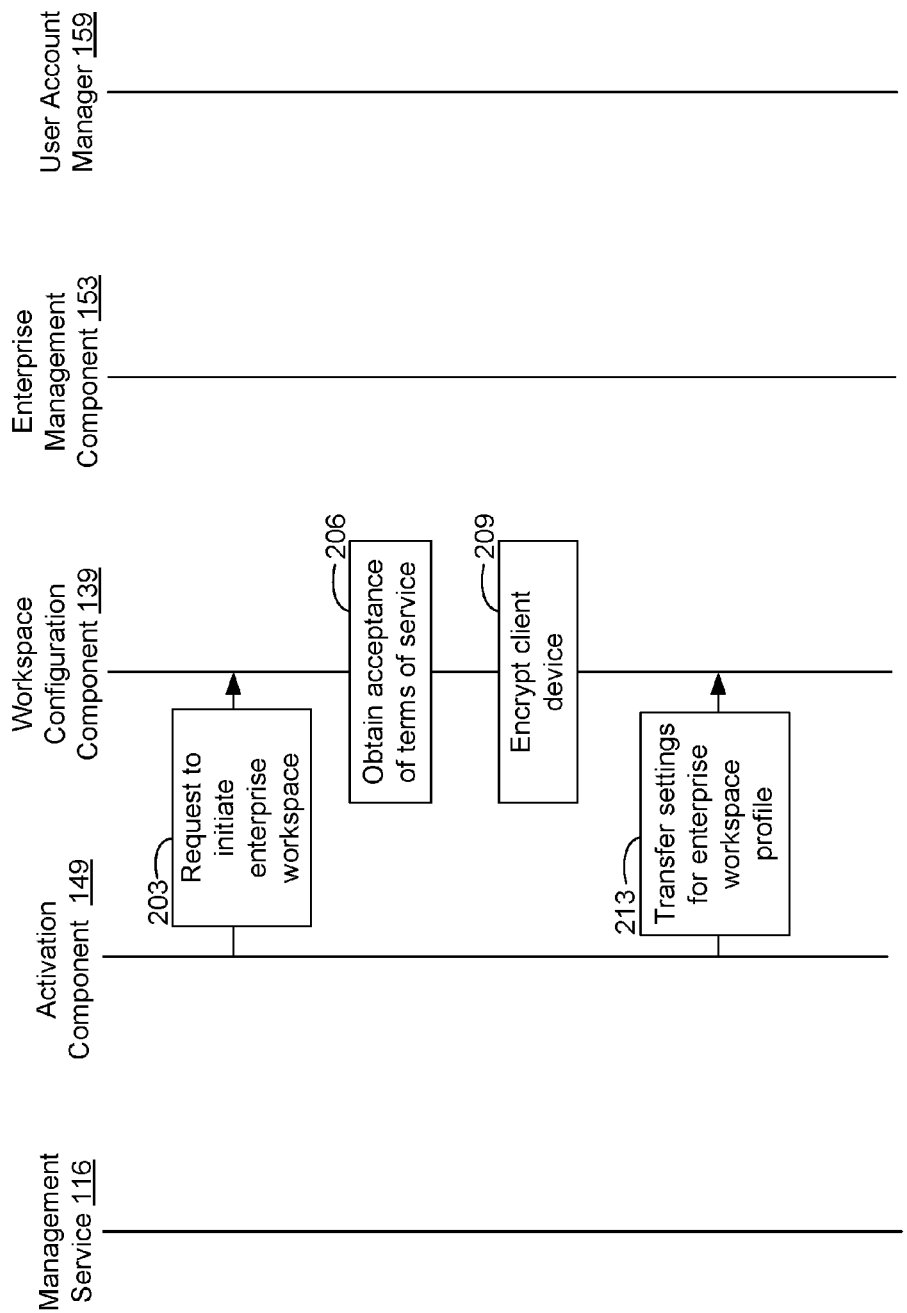

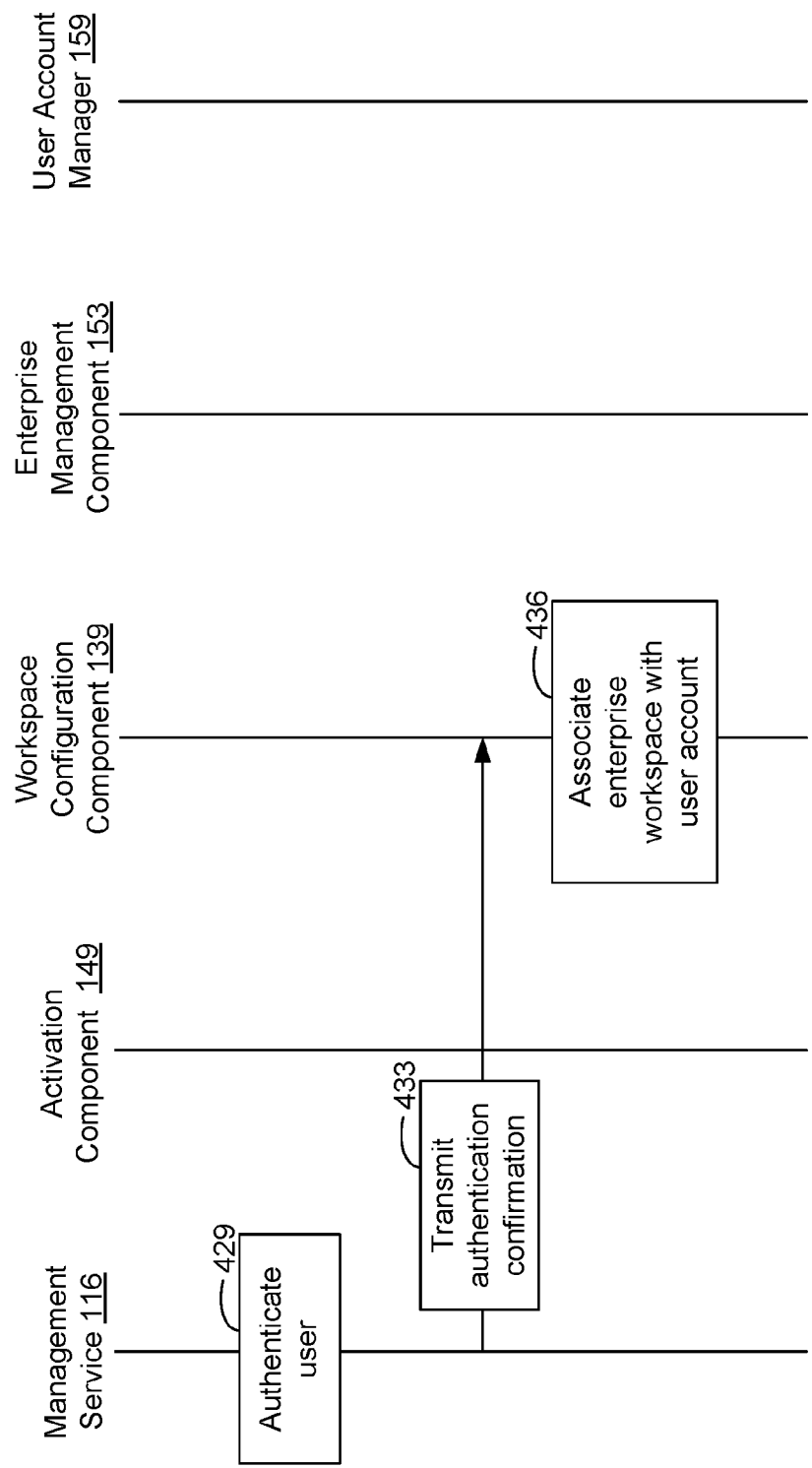

ASSOCIATING USER ACCOUNTS WITH ENTERPRISE WORKSPACES

BACKGROUND

Some companies provide their employees with computing devices that are dedicated for work purposes. These companies often impose restrictions on the usage of the devices. For example, some companies instruct their employees to refrain from using their work devices for personal activities.

Some companies implement "bring your own device" (BYOD) policies in which employees are allowed to bring their personal devices to work and to use their personal devices for work purposes. For instance, these companies may allow their employees to use their personal laptops to access their companies' internal networks, email servers, and work files.

However, if the security of an employee's personal device is compromised, the compromised device can subject a company to an increased security risk. For example, if an employee's operating system is not updated with the latest security patches, a malicious user can exploit security vulnerabilities in the compromised device to gain access to the company's resources through the user's compromised device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2C are a sequence diagram illustrating an example of component interaction.

FIGS. 4A-4C are a sequence diagram illustrating another example of component interaction.

DETAILED DESCRIPTION

The present disclosure relates to the configuration of enterprise workspaces that can be created in computing devices. In some examples, an operating system in a computing device can establish a personal workspace and an enterprise workspace in a device. The operating system can separate components and data in the enterprise workspace from components and data in the personal workspace. In addition, components can monitor, control, and restrict activity in the enterprise workspace without having to monitor, control, or restrict activity in the personal workspace.

In order to configure the enterprise workspace of the device, the operating system may require the user of the client device to create a user account with the distributor and to associate the user account with the enterprise workspace. As will be described in further detail below, components described herein can facilitate the creation of the user account as well as the process of associating the user account with the enterprise workspace.

In the following discussion, examples of systems and their components are described, followed by examples of the operation of those systems.

Figure 1:
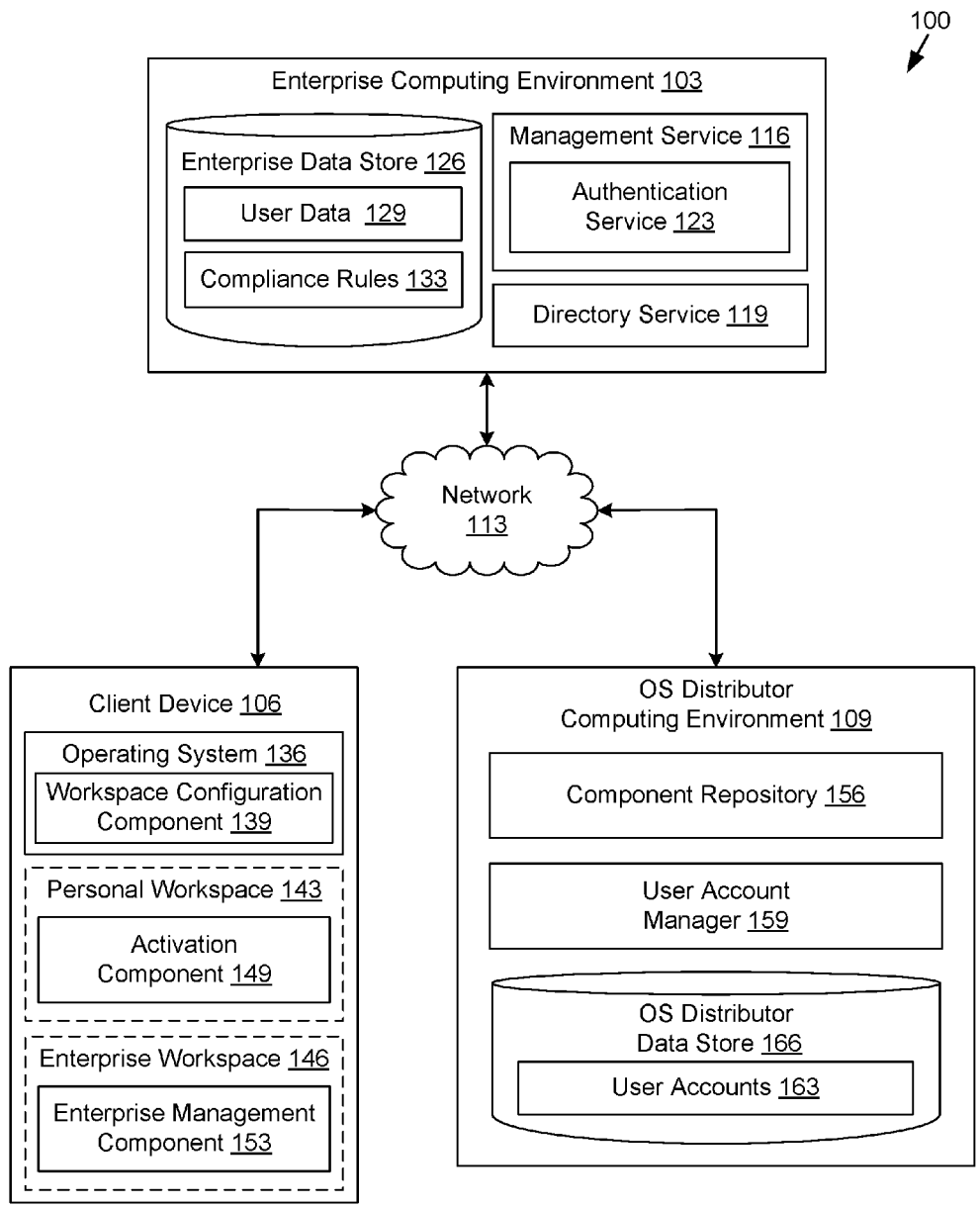
FIG. 1 is a drawing of an example of a networked environment.

With reference to FIG. 1, shown is an example of a networked environment 100. The networked environment 100 can include an enterprise computing environment 103, a client device 106, and an operating system distributor computing environment 109 in data communication through a network 113. The network 113 can include the Internet, one or more intranets, extranets, wide area networks (WANs), local area networks (LANs), wired networks, wireless networks, or any combination of two or more such networks. The network 113 can include satellite networks, cable networks, Ethernet networks, cellular networks, and telephony networks.

The enterprise computing environment 103 can be a computing system operated by one or more enterprises, such as a business or other organization. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 116 that can monitor and manage the operation of client devices 106 associated with the enterprise that operates the enterprise computing environment 103. In some examples, the management service 116 can manage and oversee the operation of multiple client devices 106 enrolled in a mobile device management service that is provided by the management service 116. The management service 116 can also provide the client devices 106 with access to email, calendar data, contact information, and other resources associated with the enterprise.

The enterprise computing environment 103 can also include a directory service 119. The directory service 119 can authenticate users and determine which particular enterprise resources a user is entitled to access. The directory service 119 can also manage the credentials, such as user names and passwords, of users that have access to resources of the enterprise computing environment 103. In some examples, the directory service 119 can include a MICROSOFT ACTIVE DIRECTORY directory service.

The management service 116 can include an authentication service 123 that can exchange user authentication and authorization data between various components. For example, a component can request the authentication service 123 to authenticate a user and notify the component whether the user has been authenticated. To this end, the authentication service 123 can obtain authentication data, such as a username and password, and authenticate the user against an identity provider, such as the directory service 119. If the directory service 119 authenticates the user, the authentication service 123 can provide a token to the component to indicate that the user is authenticated. The authentication service 123 in various examples can include a security assertion markup language (SAML) endpoint.

The enterprise computing environment 103 can also include an enterprise data store 126. The enterprise data store 126 can be representative of multiple enterprise data stores 126 accessible by components in the networked environment 100. The enterprise data store 126 can store various data associated with the enterprise computing environment 103. For example, the enterprise data store 126 can store user data 129 and compliance rules 133.

The user data 129 stored in the enterprise data store 126 can include data that represents information corresponding to users that are associated with the enterprise computing environment 103. For example, the user data 129 can specify which particular resources, such as data and applications, that a particular user is entitled to access. In addition, the user data 129 can indicate whether a user is permitted to enroll with the management service 116.

The management service 116 can assign various compliance rules 133 to respective client devices 106. The compliance rules 133 can specify, for example, one or more conditions that must be satisfied for the client device 106 to be deemed compliant with the compliance rule 133. In various examples, the enterprise computing environment 103, the client device 106, or both the enterprise computing environment 103 and the client device 106 can determine whether the client device 106 satisfies a compliance rule 133. For example, the client device 106 can generate a data object that describes the state of the client device 106 along with associated information, settings, and parameters. Components in the client device 106 or the management service 116 can evaluate the data object to determine whether the client device 106 is compliant with corresponding compliance rules 133.

In one example, a compliance rule 133 can specify that particular applications are prohibited from being installed in the client device 106. As another example, a compliance rule 133 can specify that the client device 106 must be located in a secured location, such as the premises of the enterprise that operates the enterprise computing environment 103, in order for the client device 106 to be authorized to access or render content in the client device 106. In another example, a compliance rule 133 can specify that a lock screen is required to be generated when the client device 106 is "awoken" from a low power "sleep" state and that a passcode is required for a user to unlock the lock screen.

Various compliance rules 133 can be based on time, geographical location, or device and network properties. For instance, the client device 106 can satisfy a compliance rule 133 when the client device 106 is located within a particular geographic location. The client device 106 can satisfy a compliance rule 133 in other examples when the client device 106 is in communication with a particular local area network, such as a particular local area network that is managed by the enterprise computing environment 103. Furthermore, a compliance rule 133 in another example can be satisfied upon the time and date matching specified values.

Another example of a compliance rule 133 involves whether a user belongs to a particular user group. For instance, a compliance rule 133 can include a whitelist or a blacklist that specifies whether particular users or groups of users are authorized to perform various functionality, such as installing or executing a particular application.

In some examples, an enterprise can operate the management service 116 to ensure that the client devices 106 of its users satisfy respective compliance rules 133. By ensuring that the client devices 106 of its users are operating in compliance with the compliance rules 133, the enterprise can control access to resources and thereby improve the security of devices associated with the enterprise and the users of the client devices 106.

The client device 106 can be representative of multiple client devices 106 that can be coupled to the network 113. The client device 106 can include a processor-based computer system, such as a desktop computer, a laptop computer, a personal digital assistant, a mobile phone, or a tablet computer.

The client device 106 can include an operating system 136. The operating system 136 can manage hardware and software resources in the client device 106. The operating system 136 can also provide various services, such as an interprocess communication service that can facilitate various components within the client device 106 communicating and sharing data with each other.

The operating system 136 can also include a workspace configuration component 139. The workspace configuration component 139 can create, configure, and maintain multiple workspaces in the client device 106. For example, as shown in FIG. 1, the workspace configuration component 139 can create a personal workspace 143 and an enterprise workspace 146. A workspace, such as the personal workspace 143 and the enterprise workspace 146, can be a virtual container in which components and data within the workspace are segregated and isolated from other components that are outside of the workspace. For example, the operating system 136 can prevent at least some components in the personal workspace 143 from communicating with components or accessing data within the enterprise workspace 146. Similarly, the operating system 136 can prevent at least some components in the enterprise workspace 146 from communicating with components or accessing data within the personal workspace 143. The personal workspace 143 in some examples can be regarded as being the default workspace for the client device 106.

The client device 106 can include an activation component 149 in the personal workspace 143. The activation component 149 can monitor and control components in the personal workspace 143. For instance, the personal workspace component 149 can determine whether various compliance rules 133 are satisfied. In some examples, the activation component 149 can parse a data object that describes the state of and settings in the personal workspace 143 to determine whether the client device 106 satisfies compliance rules 133. In other examples, the activation component 149 can communicate with the management service 116 to determine whether the management service 116 deems the compliance rules 133 satisfied. As will be described in further detail below, the activation component 149 can also communicate with the workspace configuration component 139 to facilitate provisioning and configuring the enterprise workspace 146.

In some examples, the activation component 149 can be a portion of the operating system 136. In another example, the activation component 149 can operate in the application layer of the client device 106. For instance, the activation component 149 can operate as a dedicated application that can monitor and manage data, software components, and hardware components associated with the client device 106.

The client device 106 can also include an enterprise management component 153 in the enterprise workspace 146. The enterprise management component 153 can monitor and control components in the enterprise workspace 146. For instance, the enterprise management component 153 can determine whether various compliance rules 133 are satisfied. To this end, the enterprise management component 153 can parse a data object that describes the state of and settings in the enterprise management component 153 to determine whether the client device 106 satisfies the compliance rules 133. In other examples, the enterprise management component 153 can communicate with the management service 116 to determine whether the management service 116 deems the compliance rules 133 satisfied. As will be described in further detail below, the enterprise management component 153 can communicate with the workspace configuration component 139 to facilitate configuration of the enterprise workspace 146.

In some examples, the enterprise management component 153 can be a portion of the operating system 136. In other examples, the enterprise management component 153 can operate in the application layer of the client device 106. For instance, the enterprise management component 153 can operate as a dedicated application that can monitor and manage data, software components, and hardware components associated with the client device 106. Furthermore, the enterprise management component 153 can include a device policy controller that can facilitate the management service 116 managing access to enterprise components and data. The device policy controller can also communicate with the management service 116 to apply device restrictions and settings and to verify compliance with compliance rules 133. Furthermore, the device policy controller can provision and configure the enterprise workspace 146, as will be described in further detail below.

The operating system distributor computing environment 109 can include components that are operated by the distributor of the operating system 136. The distributor of the operating system 136 can be an entity that develops, manages, supports, distributes, or provides updates for the operating system 136. For examples in which the operating system 136 is an ANDROID operating system, the operating system distributor computing environment 109 can be a computing environment that is associated with or is operated by Google Inc., which develops and distributes the ANDROID operating system.

The operating system distributor computing environment 109 can include a component repository 156. The component repository 156 can include a portal through which the client device 106 can obtain various components, such as applications, the operating system 136, and updates to the operating system 136. In some examples, the component repository 156 can be a public repository that can be accessed generally by the public. In other examples, the component repository 156 can be a private repository that can be accessed only by client devices 106 that are enrolled with the management service 116. Furthermore, the management service 116 can specify the particular components that the component repository 156 makes available to the client device 106. For example, the user data 129 for the client device 106 can specify that the client device 106 is assigned to a particular group, and the management service 116 can identify particular applications that are available to the group of which the client device 106 is a member.

The operating system distributor computing environment 109 can also include a user account manager 159. The user account manager 159 can create, update, and maintain user accounts 163 that can be stored in an operating system distributor data store 166. The user account manager 159 can include an interface, such as an application programming interface (API), that can facilitate the client device 106 and enterprise computing environment 103 communicating and interacting with the user account manager 159, as will be discussed in further detail below.

The operating system distributor data store 166 can be representative of multiple operating system distributor data stores 166 accessible by components in the operating system distributor computing environment 109. The operating system distributor data store 166 can store various data associated with the distributor of the operating system 136. For example, the operating system distributor data store 166 can store user accounts 163.

A user account 163 can include information associated with a user that has registered for service with the operating system distributor computing environment 109. A user account 163 can provide a user with access to services and components provided by the operating system distributor computing environment 109. For example, the user account 163 can provide a user with access to email and web-based applications that are hosted by the operating system distributor computing environment 109. In addition, the operating system 136 can require that a user account 163 be associated with the enterprise workspace 146 in order for the operating system 136 to provision the enterprise workspace 146. In examples in which the operating system 136 is an ANDROID operating system developed and distributed by Google, Inc., the user account 163 can be a GOOGLE account, which can provide access to a GMAIL email account and the GOOGLE PLAY component repository.

Next, examples of the operation of components in the networked environment 100 are described. The following discussion assumes that the activation component 149 has not been installed and that the workspace configuration component 139 has not yet provisioned the enterprise workspace 146.

The process of provisioning the enterprise workspace 146 can be initiated upon the client device 106 being enrolled with the management service 116. For example, the enterprise that operates the enterprise computing environment 103 can require its employees and contractors to enroll the client devices 106 with the management service 116 in order for the client devices 106 to have access to resources provided by the enterprise computing environment 103.

To begin, the client device 106 can install the activation component 149 in the personal workspace 143. In some examples, the enterprise computing environment 103 can provide the user of the client device 106 with instructions for obtaining and installing the activation component 149.

Once the activation component 149 is installed in the personal workspace 143, the activation component 149 can prompt the user to input his or her enterprise email address, which can be uniquely associated with the user. The activation component 149 can then transmit the enterprise email address to the management service 116, which can obtain the user data 129 that is associated with the enterprise email address. The user data 129 can indicate whether the user is authorized to enroll the client device 106 with the management service 116. In some examples, the management service 116 can authenticate the user of the client device 106 based on the enterprise email address.

If the user data 129 indicates that the user associated with the enterprise email address is authorized to enroll with the management service 116, the management service 116 can request the activation component 149 to provide device attributes, such as an indication of whether the operating system 136 is configured to provision an enterprise workspace 146 in the client device 106. In some examples, the indication of whether the operating system 136 is configured to provision an enterprise workspace 146 can include the name and version of the operating system 136 installed in the client device 106.

If the operating system 136 is configured to provision the enterprise workspace 146, the management service 116 can instruct the activation component 149 to enroll the client device 106 with the management service 116 and cause the operating system 136 to provision the enterprise workspace 146, as will now be described.

To enroll the client device 106 with the management service 116, the activation component 149 can render messages, such as a welcome message to the user, in a display of the client device 106. In addition, the activation component 149 can render a prompt requesting the user to input his or her enterprise email address and password. Upon receiving the enterprise email address and password, the activation component 149 can transmit the enterprise email address and password to the management service 116.

Once the management service 116 authenticates the user based on the enterprise email address and password, the management service 116 can associate data representing the client device 106 with the user data 129 for the user of the client device 106. In addition, the management service 116 can determine whether the client device 106 complies with compliance rules 133 that can be assigned to the client device 106.

If the client device 106 satisfies the compliance rules 133, the management service 116 can request the activation component 149 to render terms of use of the management service 116 for display to the user. The activation component 149 can then request the user of the client device 106 to accept or deny the terms of use. If the user accepts the terms of use, the activation component 149 can transmit a confirmation of the acceptance to the management service 116. In response, the management service 116 can create and store a record of the client device 106 in the enterprise data store 126. Once a record of the client device 106 has been stored in the user data 129, the activation component 149 can cause the workspace configuration component 139 to provision the enterprise workspace 146, as will now be described.

The activation component 149 can request the workspace configuration component 139 to initiate the enterprise workspace 146 by, for example, making an API call to the operating system 136 requesting to configure the enterprise workspace 146. As described above, the workspace configuration component 139 can be a component of the operating system 136 that can create, configure, and maintain the enterprise workspace 146. In response to the request, the workspace configuration component 139 can render messages, such as terms of use for the operating system 136 or enterprise workspace 146, and request the user of the client device 106 to accept or deny the terms of use. The workspace configuration component 139 can also notify the user that the operating system 136 requires the client device 106 to be encrypted prior to provisioning the enterprise workspace 146.

If the user accepts the terms of use, the workspace configuration component 139 can encrypt resources in the client device 106, if the client device 106 is not already encrypted. In some examples, encrypting the resources can require rebooting of the client device 106.

After the client device 106 is encrypted, the workspace configuration component 139 can configure an enterprise profile for the enterprise workspace 146. The enterprise profile can include data, such as compliance rules 133, that specifies permissions and restrictions for the enterprise management component 153. In various examples, the activation component 149 can transfer settings specified by compliance rules 133 or the management service 116 to the enterprise profile for the enterprise workspace 146.

The activation component 149 can then request the workspace configuration component 139 to install or activate the enterprise management component 153 in the enterprise workspace 146. Once the enterprise management component 153 is active, enterprise management component 153 can obtain configuration settings and compliance rules 133 from the management service 116.

At this point, the enterprise workspace 146 can exist, but as described above, the operating system 136 may require a user account 163 for the distributor of the operating system 136 to be associated with the enterprise workspace 146 in order for the enterprise workspace 146 to have access to services, such as the component repository 156. In some examples, the enterprise management component 153 or the management service 116 can request the user account manager 159 to provide an indication of whether a user account 163 already exists that is associated with the enterprise email address for the user of the client device 106.

If the user account manager 159 responds with a message indicating that the user does not already have a user account 163 with the distributor of the operating system 136, the management service 116 and enterprise management component 153 can create a user account 163. Various approaches of creating and associating a user account 163 with the enterprise workspace 146 will now be described.

In one approach, the management service 116 can transmit a request for the enterprise management component 153 to obtain a password for the user account 163 that is to be created for the user. Upon receiving the request, the enterprise management component 153 can request the user of the client device 106 to input a password for the user account 163. After the user provides a password, the enterprise management component 153 can transmit the password to the management service 116. In alternative examples, the management service 116 or the enterprise management component 153 can generate a password, such as a randomized password, without input from the user.

The management service 116 or the enterprise management component 153 can then transmit a request for the user account manager 159 in the operating system distributor computing environment 109 to create a user account 163 for the user. As discussed above, user account manager 159 can provide a communication interface, such as an API, that can facilitate components, such as the management service 116 or the enterprise management component 153 requesting creation of a user account 163. Thus, in some examples, the management service 116 or enterprise management component 153 can transmit an API call to the user account manager 159 requesting creation of a user account 163. The API call can specify that a username for the user account 163 is the enterprise email address for the user and that the password for the user account 163 is the same as the password previously generated by the management service 116, enterprise management component 153, or user of the client device 106, as described above. The user account manager 159 can then create the user account 163 based on the enterprise email address and password and notify the management service 116 or the enterprise management component 153 of the creation.

After the enterprise management component 153 is notified of the creation of the user account 163, the enterprise management component 153 can request the workspace configuration component 139 to render a user interface for configuring the enterprise workspace 146. In some examples, the enterprise management component 153 can make the request by providing an API call to the operating system 136. In response, the workspace configuration component 139 can render a user interface that includes input fields for an email address and a password. The enterprise management component 153 can then populate the field for the email address with the enterprise email address associated with the user of the client device 106. In other examples, the user can manually input the enterprise email address into the field for the email address.

The enterprise management component 153 can then prompt the user to input the password for the user account 163 into the password field of the user interface. In alternative examples, the enterprise management component 153 can automatically populate the password field with the password for the user account 163.

After the enterprise email address and password for the user account 163 have been input into the user interface, the workspace configuration component 139 can communicate with the user account manager 159 to authenticate the user based on the email address and password. If the user account manager 159 authenticates the user, the user account manager 159 can notify the workspace configuration component 139. In response to the workspace configuration component 139 being notified of the authentication, the workspace configuration component 139 can associate the user account 163 with the enterprise management component 153. Then, as described above, components in the enterprise workspace 146 can access various services, such as the component repository 156 provided by the distributor of the operating system 136. Additionally, in some examples, the enterprise management component 153 can request the operating system 136 to uninstall the activation component 149 in the personal workspace 143.

Another approach of creating and associating a user account 163 with the enterprise workspace 146 can involve the authentication service 123 provided by the management service 116. As described, above the authentication service 123 can include a SAML endpoint.

For examples that involve the authentication service 123, the management service 116 or the enterprise management component 153 can transmit a request for the user account manager 159 to create a user account 163 for the user. To this end, the management service 116 or enterprise management component 153 can transmit an API call to the user account manager 159 requesting creation of a user account 163. The API call can specify that a username for the user account 163 is the enterprise email address for the user. In addition, the API call can specify that the authentication service 123 will be performing authentication for the user on behalf of the user account manager 159. In some examples, the API call can include a password data, such as a randomized password or a placeholder password, for the user account 163, even though the authentication service 123 will be performing the user authentication without a password for the user account 163. The user account manager 159 can then create the user account 163 based on the enterprise email address and notify the management service 116 or the enterprise management component 153 of the creation.

The enterprise management component 153 can then request the workspace configuration component 139 to render a user interface for configuring the enterprise workspace 146. For example, the enterprise management component 153 can make the request by providing an API call to the operating system 136. In response, the workspace configuration component 139 can render a user interface that includes an input field for an email address. The enterprise management component 153 can then populate the field for the email address with the enterprise email address associated with the user of the client device 106. In other examples, the user can manually input the enterprise email address into the email address field.

The enterprise management component 153 can then transmit a request for the authentication service 123 to authenticate the user. Because the authentication service 123 has already authenticated the user when the user provided his or her credentials to enroll with the management service 116, as described above, the authentication service 123 can authenticate the user without any additional input from the user of the client device 106.

The management service 116 can then transmit an authentication confirmation to the workspace configuration component 139. For examples in which the authentication service 123 includes a SAML endpoint, the authentication confirmation can include a SAML authentication token.

In response to receiving the authentication confirmation from the authentication service 123, the workspace configuration component 139 can associate the user account 163 with the enterprise management component 153. Then, as described above, components in the enterprise workspace 146 can access various services, such as the component repository 156 provided by the distributor of the operating system 136. Additionally, in some examples, the enterprise management component 153 can request the operating system 136 to uninstall the activation component 149 in the personal workspace 143.

Figure 2B:
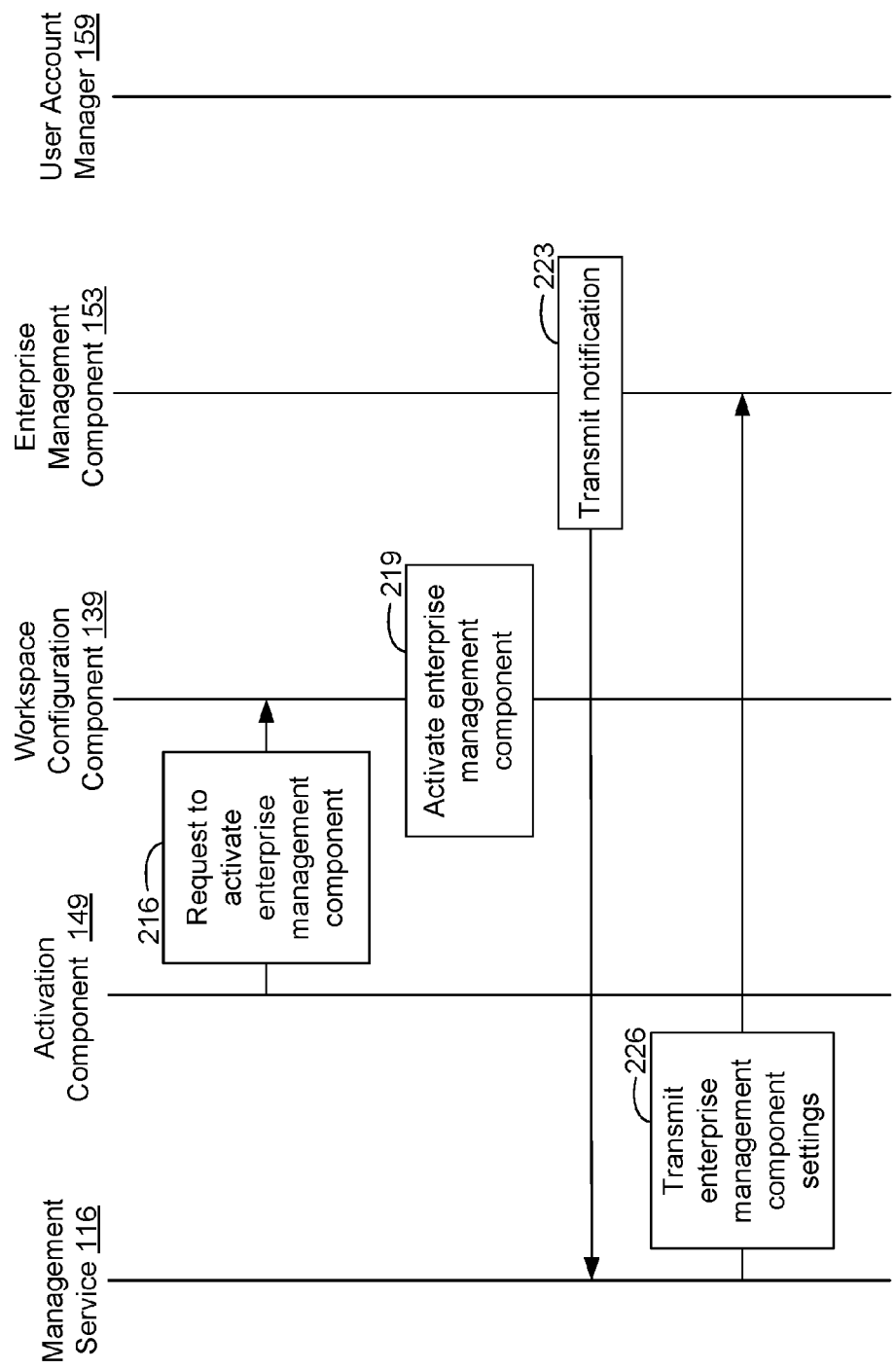
Figure 2C:
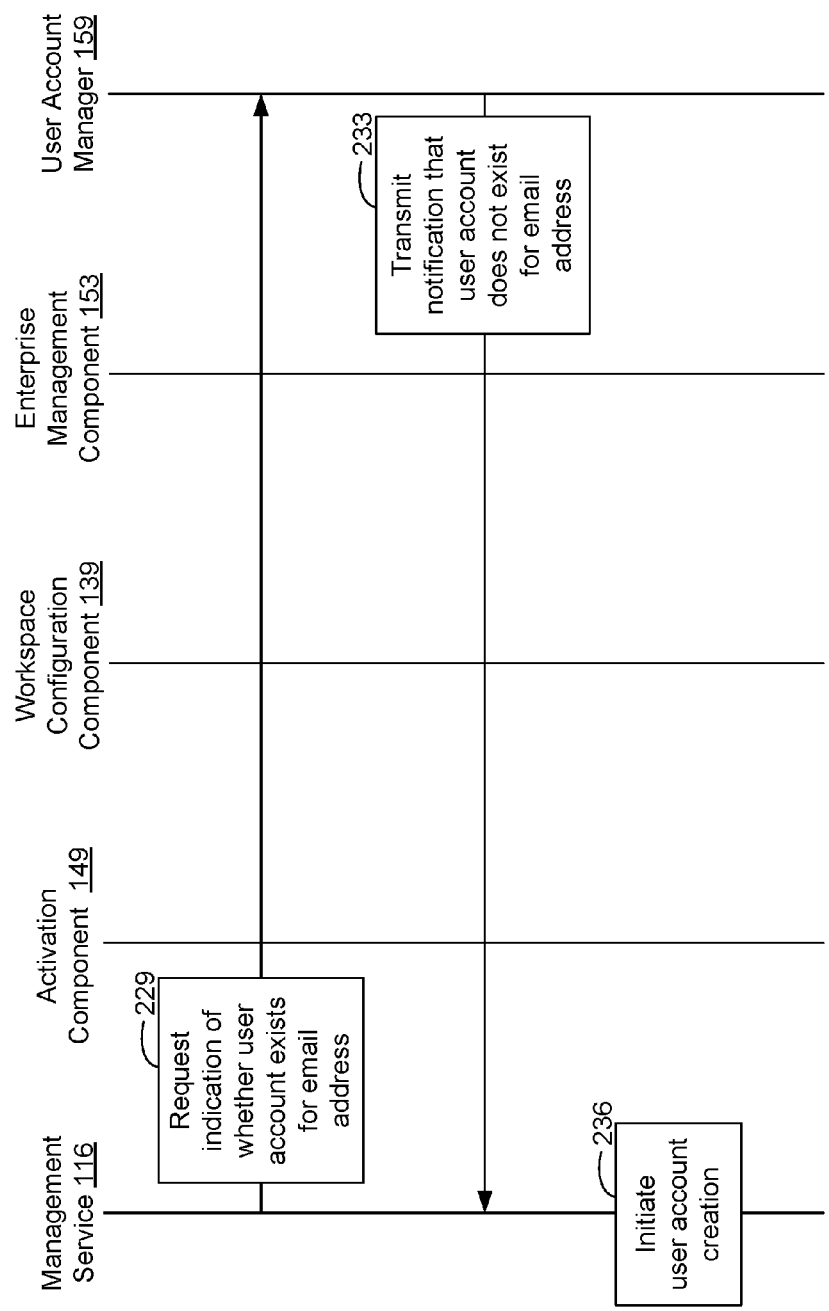

With reference to FIGS. 2A-2C, shown is a sequence diagram illustrating an example of interactions of components in the networked environment 100. The sequence diagram of FIGS. 2A-2C illustrate an example of components determining that a user account 163 is to be created on behalf of the user of the client device 106.

Beginning with step 203, the activation component 149 can request the workspace configuration component 139 to initiate the enterprise workspace 146. In some examples, this can involve the activation component 149 providing an API call to the operating system 136 to request the workspace configuration component 139 to initiate the enterprise workspace 146.

At step 206, the workspace configuration component 139 can obtain acceptance from the user of terms of service for the operating system 136 or enterprise workspace 146. In some examples, the workspace configuration component 139 can render a user interface that displays the terms of service for the user. The user can select a button in the user interface to indicate that the user accepts the terms of service.

As described above, the operating system 136 may require the client device 106 to be encrypted prior to creating the enterprise workspace 146. As such, at step 209, the workspace configuration component 139 can encrypt the client device 106. In some examples, encrypting the client device 106 can require a reboot of the client device 106.

The activation component 149 can then transfer settings for a profile for the enterprise workspace 146, as shown at step 213. The profile can include data, such as compliance rules 133, that specifies permissions and restrictions for the enterprise management component 153. The activation component 149 can obtain the settings for the profile from the management service 116.

At step 216, which is shown in FIG. 2B, the activation component 149 can request the workspace configuration component 139 to activate the enterprise management component 153. To this end, the activation component 149 can provide an API call to the operating system 136 requesting activation of the enterprise management component 153. In response to the request, the workspace configuration component 139 can activate the enterprise management component 153, as shown at step 219.

At step 223, the enterprise management component 153 can then transmit a message to the management service 116 to notify the management service 116 that the enterprise management component 153 is active. In response, the management service 116 can transmit settings for the enterprise management component 153, as indicated at step 226. For instance, the management service 116 can provide the enterprise management component 153 with compliance rules 133 that the management service 116 assigned to the client device 106.

At step 229, which is shown in FIG. 2C, the management service 116 can then request, from the user account manager 159, an indication of whether a user account 163 associated with the enterprise email account already exists in the operating system distributor data store 166. To this end, the management service 116 can transmit an API call to the user account manager 159 with the enterprise email address as a parameter. In the present example, a user account 163 does not already exist for the enterprise email address. As such, the user account manager 159 can respond to the management service 116 by transmitting a notification that the user account 163 does not already exist, as shown at step 233.

The management service 116 can then initiate creation of a user account 163 for the enterprise email address, as shown at step 236. To this end, approaches described with respect to FIGS. 3A-3C and 4A-4C can be applied.

Figure 3A:
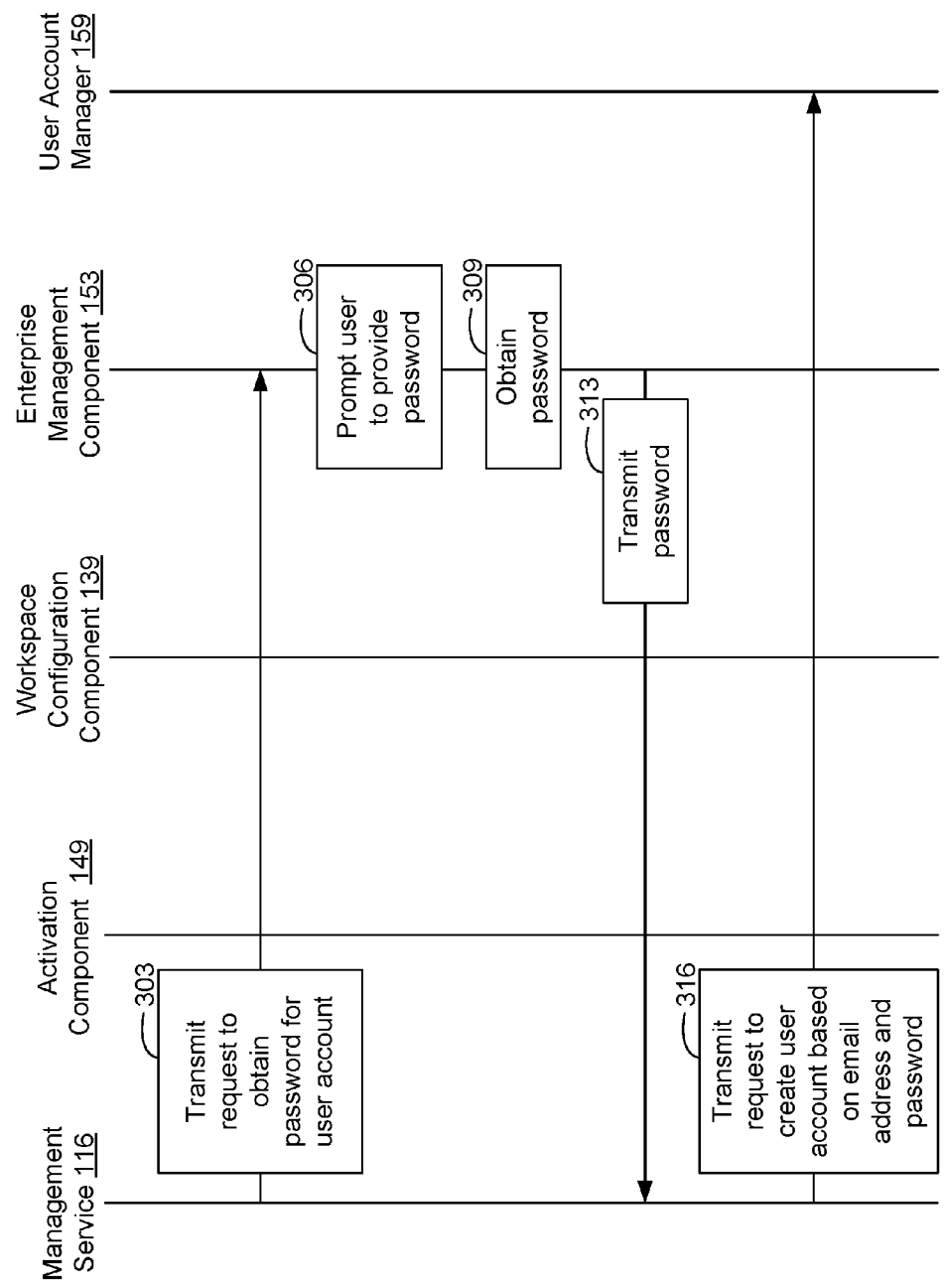
FIGS. 3A-3C are a sequence diagram illustrating another example of component interaction.
Figure 3B:
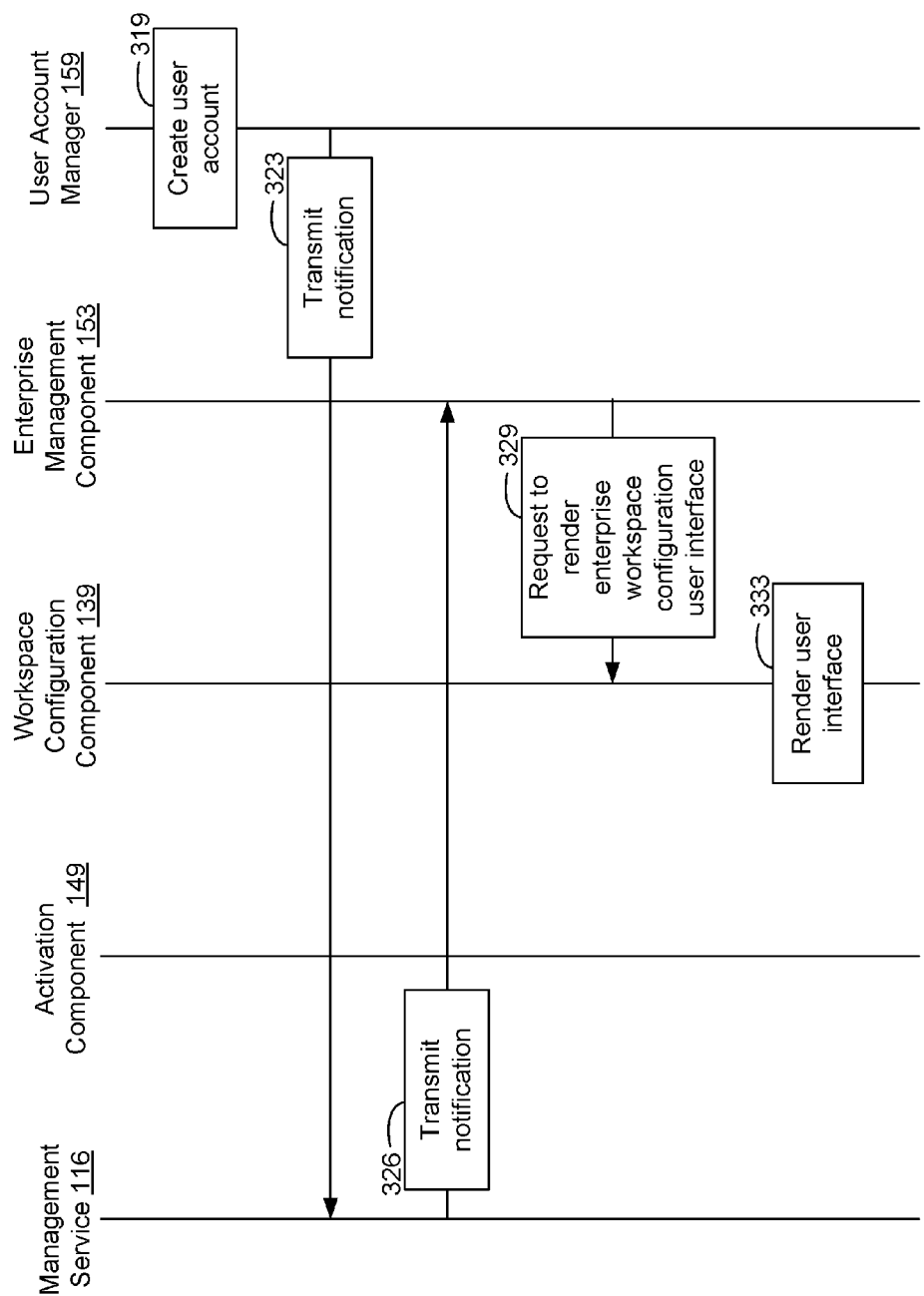
Figure 3C:
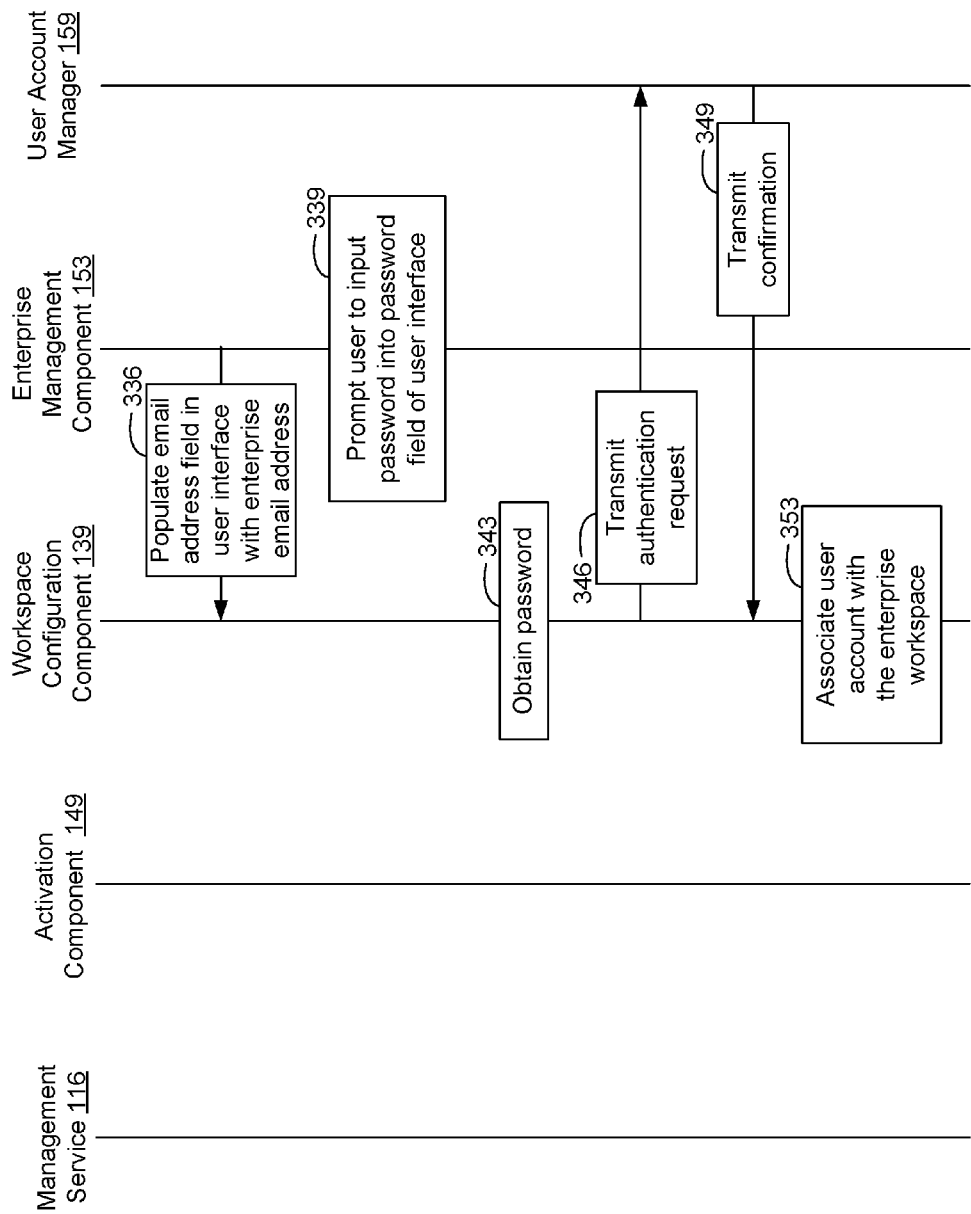

With reference to FIGS. 3A-3C, shown is a sequence diagram illustrating another example of interactions of components in the networked environment 100. The sequence diagram of FIGS. 3A-3C illustrate an example of components creating a user account 163.

As shown at step 303, the management service 116 can transmit a request for the enterprise management component 153 to obtain a password from the user for the user account 163 that is to be created. At step 306, the enterprise management component 153 can prompt the user to provide a password. For example, the enterprise management component 153 can render a message in a user interface requesting the user to input a password. Then, at step 309, the enterprise management component 153 can obtain the password from the user. In other examples, the enterprise management component 153 or the management service 116 can generate a password without input from the user.

At step 313, the enterprise management component 153 can transmit the password to the management service 116. Then, as shown at step 316, the management service 116 can transmit a request for the user account manager 159 to create a user account 163 based on the enterprise email address for the user and the password obtained from the enterprise management component 153. As described above, the request can be in the form of an API call that includes the enterprise email address and password as parameters.

At step 319, which is shown in FIG. 3B, the user account manager 159 can create the user account 163. Thereafter, the user account manager 159 can transmit a notification to the management service 116 notifying the management service 116 of the account creation, as shown at step 323. At step 326, the management service 116 can notify the enterprise management component 153 of the account creation.

The enterprise management component 153 can then request the workspace configuration component 139 to render a user interface for configuring the enterprise workspace 146, as indicated at step 329. As described above, the user interface can include fields in which an email address and password can be input. At step 333, workspace configuration component 139 can render the user interface.

At step 336, which is shown in FIG. 3C, the enterprise management component 153 can then populate the email address field in the user interface with the enterprise email address for the user. The enterprise management component 153 can then prompt the user to input the password for the user account 163 into the password field of the user interface, as indicated at step 339. In other examples, the enterprise management component 153 or the management service 116 can populate the password field with the password. As shown at step 343, the workspace configuration component 139 can obtain the password in the password field of the user interface.

The workspace configuration component 139 can then transmit a request for the user account manager 159 to authenticate the user of the client device 106 based on the obtained enterprise email address and password, as shown at step 346. In the present example, the user account manager 159 has authenticated the user, so the user account manager 159 can transmit a confirmation of the authentication to the workspace configuration component 139, as shown at step 349.

In response to obtaining the authentication confirmation from the user account manager 159, the workspace configuration component 139 can associate the user account 163 with the enterprise workspace 146, as shown at step 353. As described above, the operating system 136 can then provide components in the enterprise workspace 146 with access to services, such as the component repository 156.

Figure 4A:
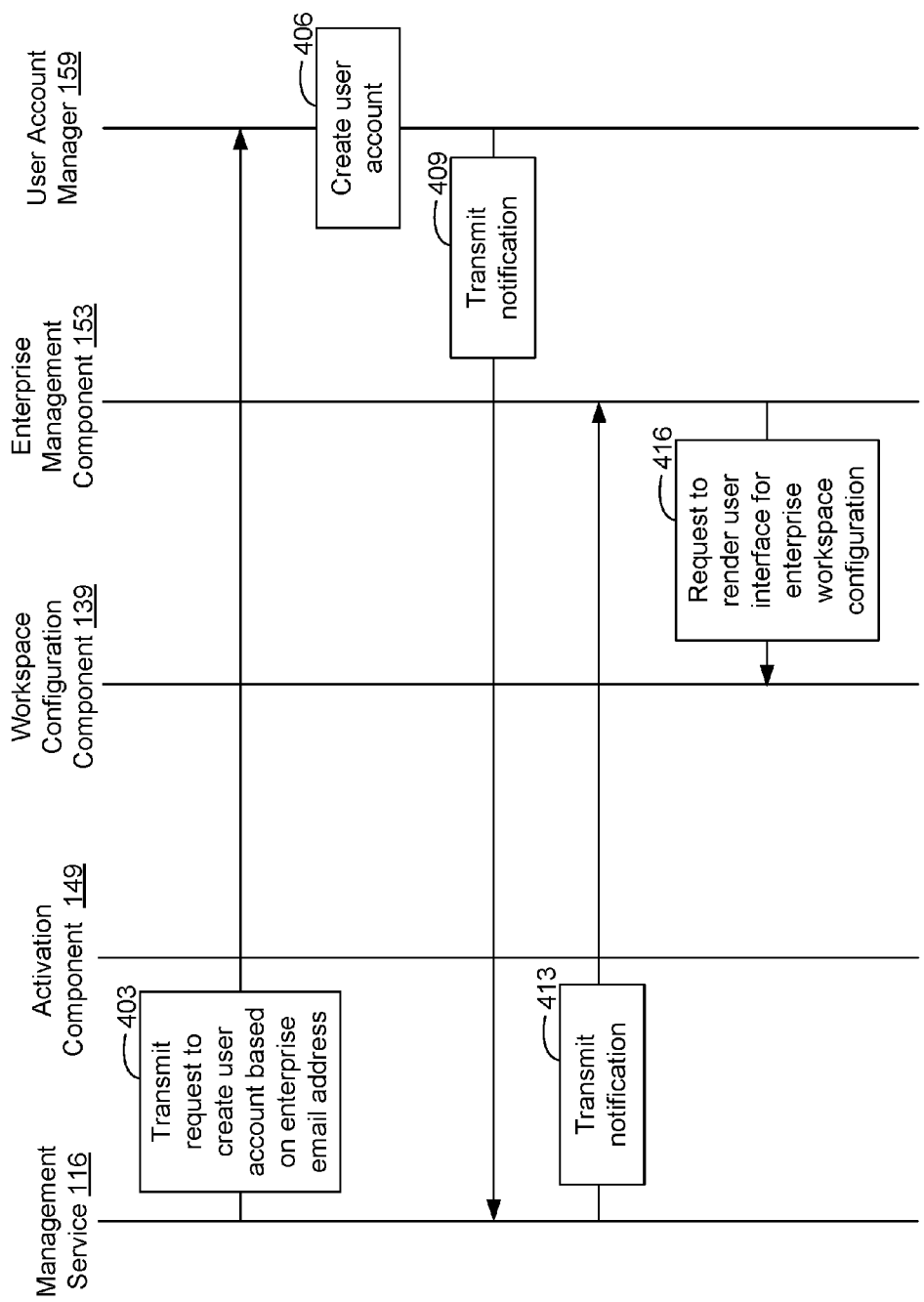
Figure 4B:
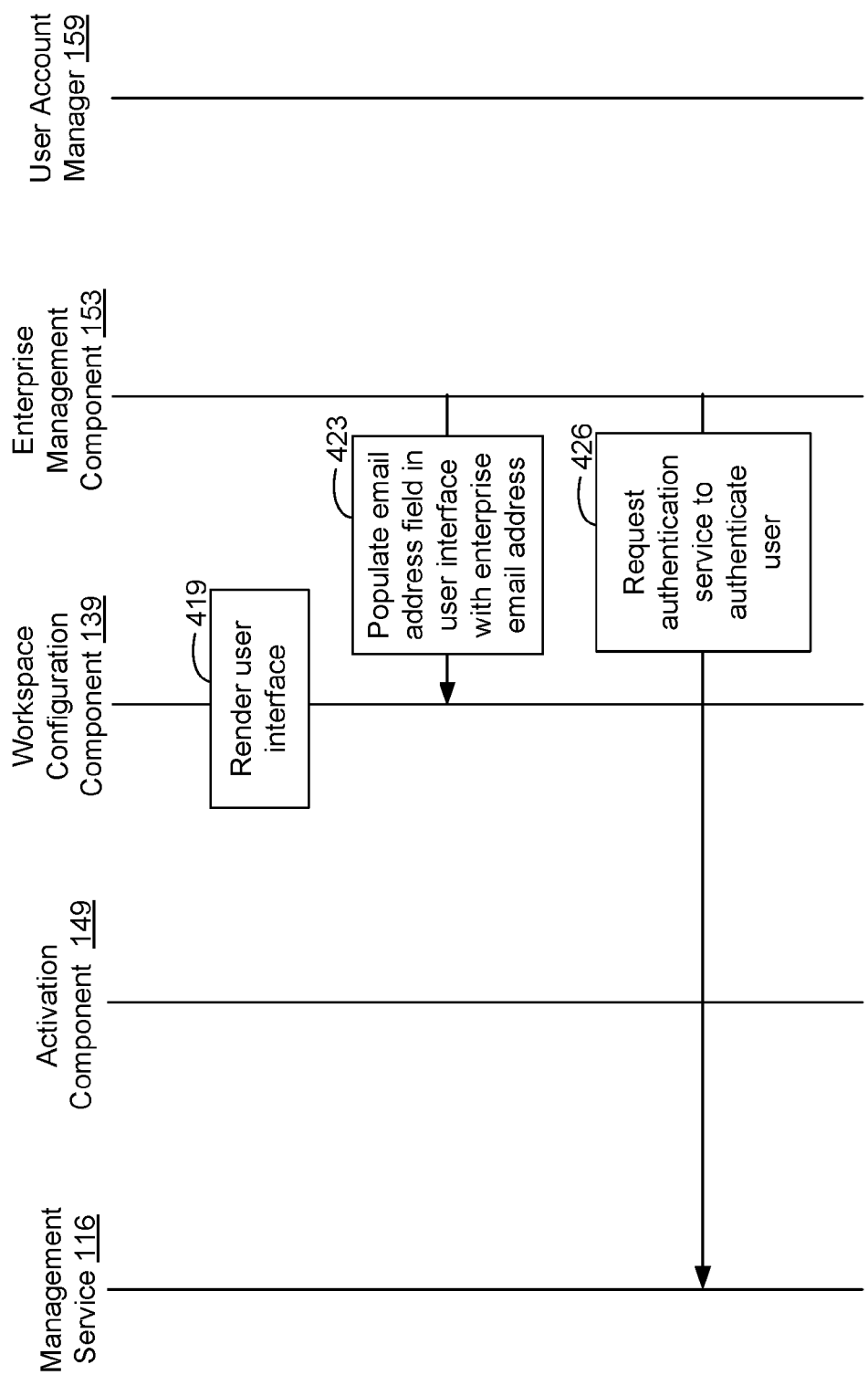

With reference to FIGS. 4A-4C, shown is a sequence diagram illustrating another example of interactions of components in the networked environment 100. The sequence diagram of FIGS. 4A-4C illustrate another example of components creating a user account 163.

To begin, at step 403, the management service 116 can transmit a request for the user account manager 159 to create a user account 163 based on the enterprise email address for the user. In addition, the request can notify the user account manager 159 that the authentication service 123 will be performing authentication for the user on behalf of the user account manager 159.

At step 406 the user account manager 159 can create the user account 163. Thereafter, the user account manager 159 can transmit a notification to the management service 116 notifying the management service 116 of the account creation, as shown at step 409. At step 413, the management service 116 can notify the enterprise management component 153 of the account creation.

The enterprise management component 153 can then request the workspace configuration component 139 to render a user interface for configuring the enterprise workspace 146, as indicated at step 329. As described above, the user interface can include fields in which an email address and password can be input. At step 416, workspace configuration component 139 can render the user interface. As shown at step 419, which is shown FIG. 4B, the workspace configuration component 139 can render the user interface. Then, at step 423, the enterprise management component 153 can populate the email address field in the user interface with the enterprise email address for the user. In other examples, the user can input the enterprise email address into the field of the user interface.

Then, as shown at step 426, the enterprise management component 153 can request the authentication service 123 for the management service 116 to authenticate the user. As described above, the authentication service 123 can include a SAML endpoint that can authenticate the user against the directory service 119. Because the authentication service 123 can have previously authenticated the user based on the enterprise email address and a password for the management service 116, the authentication service 123 can authenticate the user without the user providing additional information. In other examples, the authentication service 123 can request the user to provide credentials, such as the enterprise email address and a password for the management service 116 in order to authenticate the user.

At step 429, which is shown in FIG. 4C, the authentication service 123 in the management service 116 can authenticate the user and then transmit a notification of the authentication to the workspace configuration component 139, as indicated at step 433. Upon obtaining the authentication confirmation from the management service 116, the workspace configuration component 139 can associate the user account 163 with the enterprise workspace 146, as shown at step 436. As described above, the operating system 136 can then provide components in the enterprise workspace 146 with access to services, such as the component repository 156.

Figure 5:
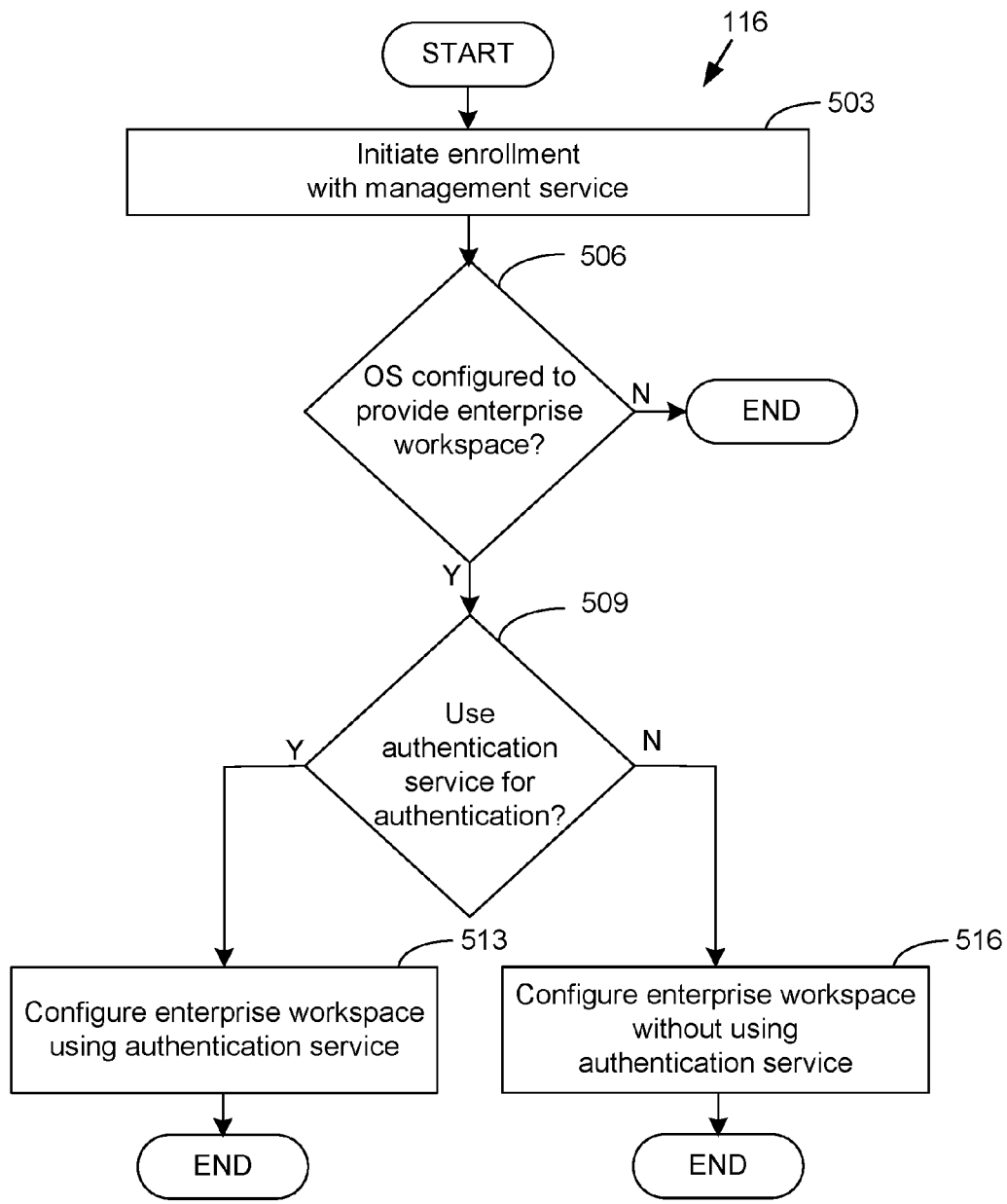
FIG. 5 is a flowchart illustrating an example of functionality implemented by a management service.

With reference to FIG. 5, shown is a flowchart that provides an example of a portion of the operation of the management service 116. In particular, FIG. 5 provides an example of the management service 116 determining whether to cause an enterprise workspace 146 to be provisioned in the client device 106 and whether to use the authentication service 123 to authenticate the user. The flowchart of FIG. 5 can be viewed as depicting an example of a method implemented in the enterprise computing environment 103.

Beginning with step 503, the management service 116 can initiate the enrollment of the client device 106 with the management service 116. For example, the management service 116 can receive a notification from the client device 106 that the client device 106 seeks to enroll with the management service 116.

At step 506, the management service 116 can determine whether the operating system 136 in the client device 106 is configured to provide an enterprise workspace 146. To this end, the management service 116 can request the client device 106 to identify the type and version of the operating system 136, and the management service 116 can determine whether the identified operating system 136 is in a list of operating systems 136 that are configured to provide an enterprise workspace 146.

If the operating system 136 is not configured to provide an enterprise workspace 146, the process can end as shown. Otherwise, if the operating system 136 is configured to provide an enterprise workspace 146, the management service 116 can determine whether the authentication service 123 is to be used for authentication of the user of the client device 106, as indicated at step 509. To this end, the management service 116 can consult user data 129 specifying whether the authentication service 123 is to be used for authentication.

If the authentication service 123 is not to be used, the management service 116 can move to step 516 and configure the enterprise workspace 146 without using the authentication service 123. An example of the enterprise workspace 146 being configured without the authentication service 123 is discussed with respect to FIGS. 6-8 below. If the management service 116 determines that the authentication service 123 is to be used for authentication, the management service 116 can move to step 513 and configure the enterprise workspace 146 using the authentication service 123. An example of the enterprise workspace 146 being configured using the authentication service 123 is discussed with respect to FIGS. 9-11 below. After steps 513 or 516, the process can end as shown.

Figure 6:
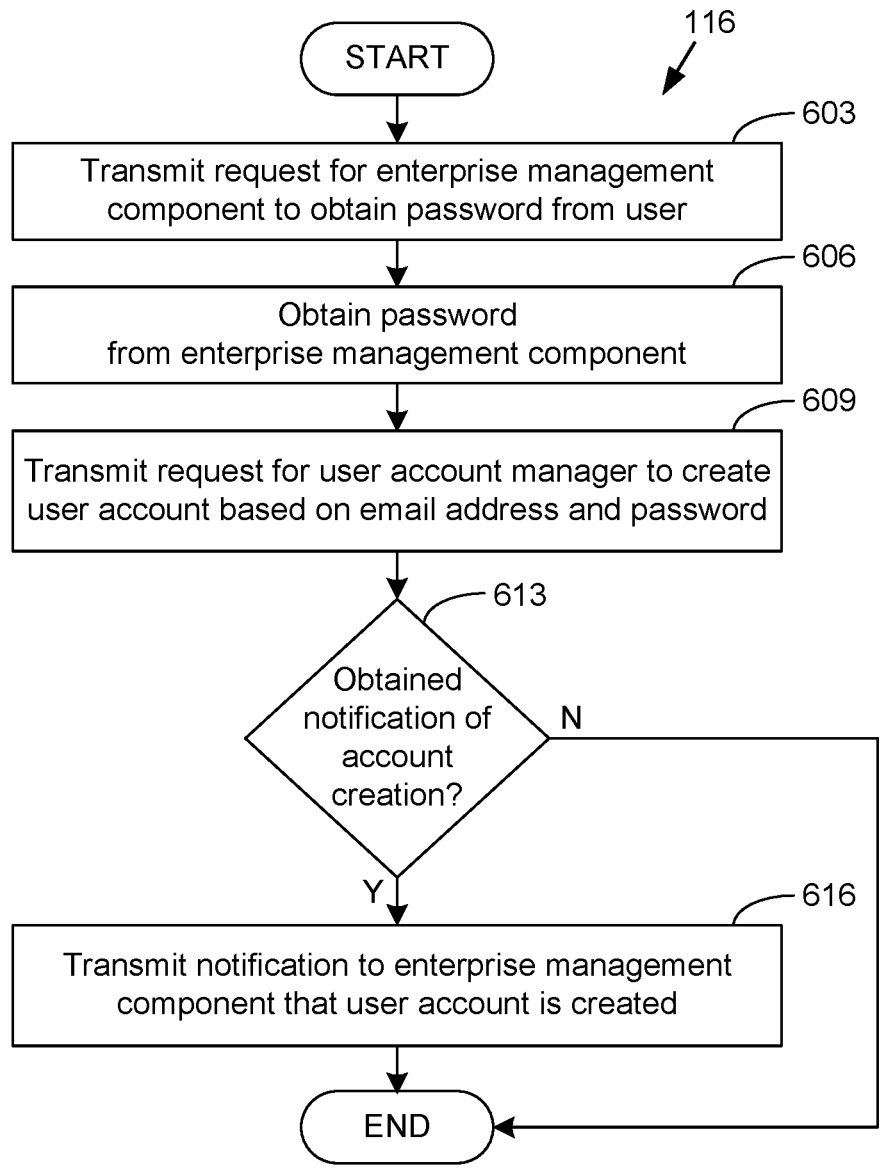
FIG. 6 is a flowchart illustrating another example of functionality implemented by a management service.

With reference to FIG. 6, shown is a flowchart that provides another example of a portion of the operation of the management service 116. In particular, FIG. 6 provides an example of the management service 116 creating a user account 163 with the distributor of the operating system 136 for examples in which the authentication service 123 is not being used to authenticate the user. The flowchart of FIG. 6 can be viewed as depicting an example of a method implemented in the enterprise computing environment 103.

To begin, the management service 116 can transmit a request for the enterprise management component 153 to obtain a password from the user, as shown at step 603. The password can be the password that will be used to access the user account 163 that is to be created. At step 606, the management service 116 can obtain the password from the enterprise management component 153. In other examples, the management service 116 or the enterprise management component 153 can generate a password, instead of the user providing a password.

At step 609, the management service 116 can then transmit a request for the user account manager 159 to create a user account 163 for the user based on the user's enterprise email address and the password provided by the user. To this end, the management service 116 can transmit an API call to the user account manager 159 with the enterprise email address and password as a parameter in the call. The user account manager 159 can recognize the API call as a request to create a user account 163.

The management service 116 can then move to step 613 and determine whether it obtained a notification from the user account manager 159 of the creation of the user account 163. If not, the process can end as shown. Otherwise, if the management service 116 obtains a notification that the user account 163 is created, the management service 116 can transmit a notification to the enterprise management component 153 that the user account 163 is created. Thereafter, the process can end.

Figure 7:
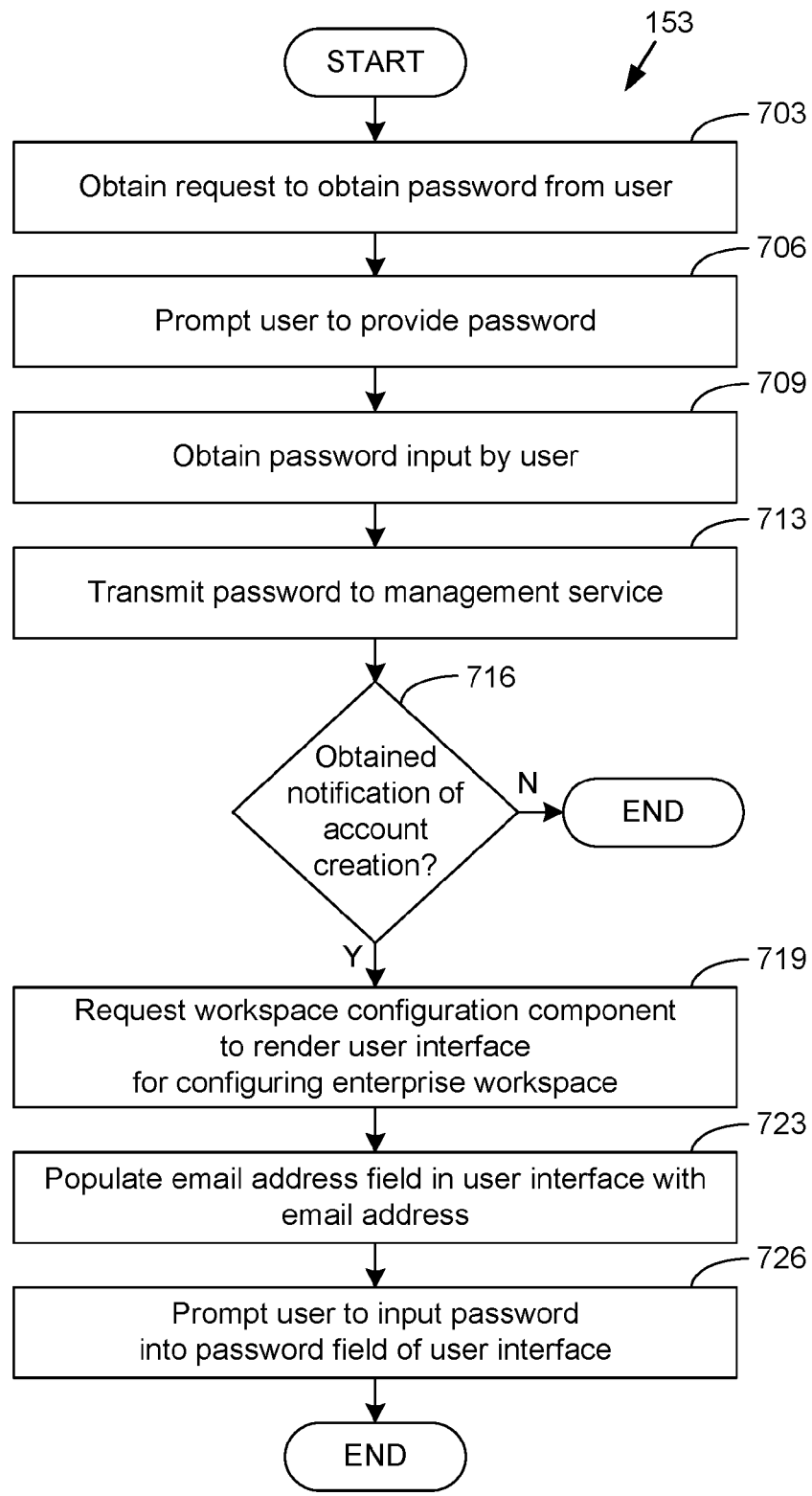
FIG. 7 is a flowchart illustrating an example of functionality implemented by an enterprise management component.

With reference to FIG. 7, shown is a flowchart that provides an example of a portion of the operation of the enterprise management component 153. In particular, FIG. 7 provides an example of the enterprise management component 153 causing a user account 163 to be associated with the enterprise workspace 146. The flowchart of FIG. 7 can be viewed as depicting an example of a method implemented in the client device 106.

Beginning with step 703, the enterprise management component 153 can obtain a request to obtain a password from the user of the client device 106. As described above, the request can be received from the management service 116. The received password can be the password for accessing the user account 163 to be created.

Then, at step 706, the enterprise management component 153 can prompt the user to provide a password. In some examples, the enterprise management component 153 can render a user interface with a message requesting the user to provide a password. As shown at step 709, the enterprise management component 153 can then obtain a password input by the user. At step 713, the enterprise management component 153 can transmit the received password to the management service 116.

As indicated at step 716, the enterprise management component 153 can determine whether it obtained a notification indicating that a user account 163 has been created based on the user's enterprise email address and the password obtained at step 709. As described above, the management service 116 can forward a notification of the account creation from the user account manager 159.

If a notification indicating that the user account 163 is created is not obtained, the process can end as shown. Otherwise, if the enterprise management component 153 obtains a notification of an account creation, the enterprise management component 153 can move to step 719 and request the workspace configuration component to render a user interface for configuring the enterprise workspace 146. To this end, the enterprise management component 153 can provide an API call to the operating system 136. As discussed above, the user interface for configuring the enterprise workspace can include fields for the enterprise email address and password associated with the user account 163.

At step 723, the enterprise management component 153 can populate the email address field in the user interface with the user's enterprise email address. In other examples, the user can input the enterprise email address into the user interface.

In addition, as shown at step 726, the enterprise management component can prompt the user to input the password associated with the user account 163 into the password field of the user interface. In other examples, the enterprise management component 153 can populate the password field with the password by copying the password when obtained at step 709. Thereafter, the process can end.

Figure 8:
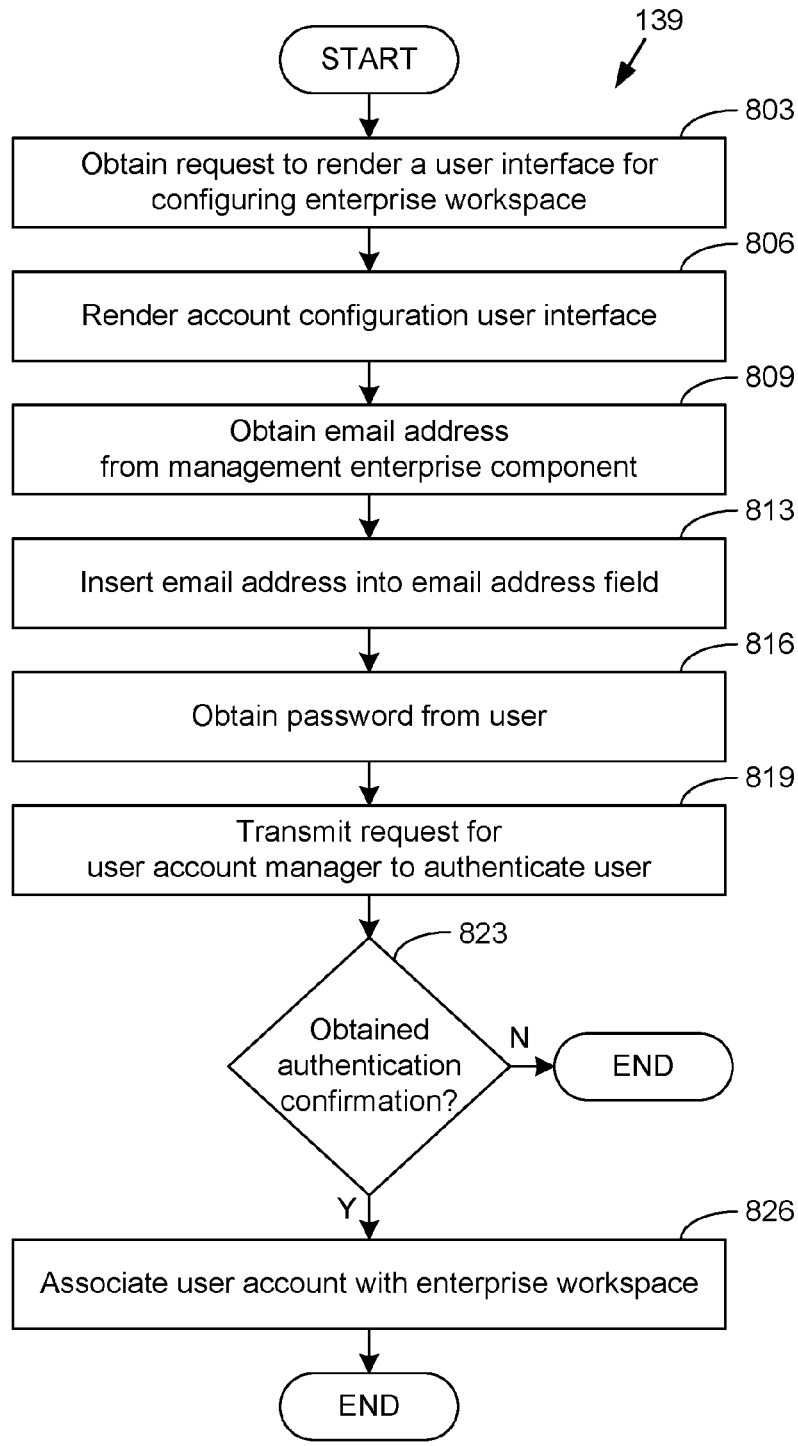
FIG. 8 is a flowchart illustrating an example of functionality implemented by a workspace configuration component.

With reference to FIG. 8, shown is a flowchart that provides an example of a portion of the operation of the workspace configuration component 139. In particular, FIG. 8 provides an example of the workspace configuration component 139 associating a user account 163 with the enterprise workspace 146. The flowchart of FIG. 8 can be viewed as depicting an example of a method implemented in the client device 106.

Beginning with step 803, the workspace configuration component 139 can obtain a request to render a user interface for configuring the enterprise workspace 146. As described above, the enterprise management component 153 can provide the request. At step 806, the workspace configuration component 139 can render the user interface, which can include fields for inputting an email address and a password associated with the user account 163. At step 809, the workspace configuration component 139 can obtain the user's enterprise email address from, for example, the enterprise management component 153. Thereafter, the workspace configuration component 139 can insert the enterprise email address into the email address field of the user interface, as shown at step 813.

At step 816, the workspace configuration component 139 can also obtain, from the user, the password for the user account 163. In alternative examples, the enterprise management component 153 can provide the password.

As shown at step 819, the workspace configuration component 139 can transmit a request for the user account manager 159 to authenticate the user based on the obtained email address and password. The workspace configuration component 139 can then determine whether it received a confirmation that the user account manager 159 authenticated the user, at step 823. If not, the process can end. If the workspace configuration component 139 does obtain a confirmation from the user account manager 159, the workspace configuration component can associate the user account 163 with the enterprise workspace 146, as shown at step 826. Thereafter, the process can end.

Figure 9:
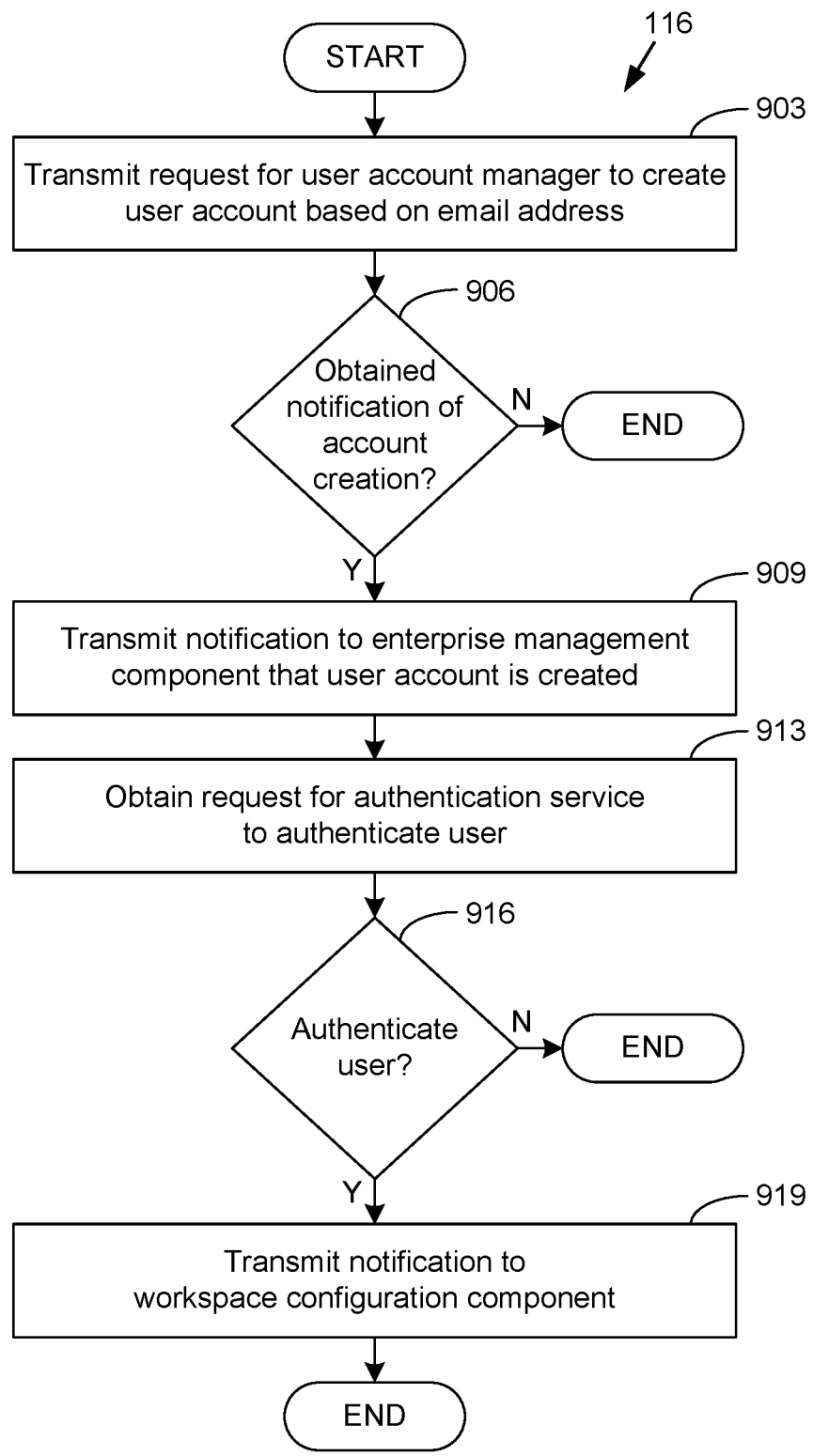
FIG. 9 is a flowchart illustrating another example of functionality implemented by a management service.

With reference to FIG. 9, shown is a flowchart that provides an example of a portion of the operation of the management service 116. In particular, FIG. 9 provides an example of the management service 116 creating a user account 163 with the distributor of the operating system 136 for examples in which the authentication service 123 is being used to authenticate the user. The flowchart of FIG. 9 can be viewed as depicting an example of a method implemented in the enterprise computing environment 103.

Beginning with step 903, the management service 116 can transmit a request for the user account manager 159 to create a user account 163 based on the enterprise email address associated with the user of the client device 106. To this end, the management service 116 can transmit an API call to the user account manager 159 that includes the enterprise email address as a parameter. In addition, the API call can specify that the authentication service 123 will be authenticating the user on behalf of the user account manager 159.

At step 906, the management service 116 can determine whether it received a notification of the user account 163 being created. The notification can be provided by the user account manager 159. If a notification confirming the account creation is not received, the process can end as shown. Otherwise, if the management service 116 obtains a notification that the user account 163 is created, the management service 116 can move to step 909 and transmit a notification to the enterprise management component 153 that the user account 163 is created.

At step 913, the management service 116 can obtain a request for the authentication service 123 to authenticate the use. As previously described, the authentication service 123 can include a SAML endpoint that authenticates users against the directory service 119. As shown at step 916, the management service 116 can determine whether to authenticate the user. In some examples, the authentication service 123 may have previously authenticated the user during the management service 116 enrollment process. If so, the authentication service 123 can rely on the pervious authentication and determine to authenticate the user. In other examples, the authentication service 123 can request the user to provide authentication information, such as an enterprise email address and password or biometric data, in order to authenticate the user.

If the management service 116 determines to not authenticate the user, the process can end as shown. Otherwise, if the management service 116 determines to authenticate the user, the management service 116 can move to step 919 and transmit an authentication notification to the workspace configuration component 139. In some examples, the notification can include a SAML authentication token. Thereafter, the process can end.

Figure 10:
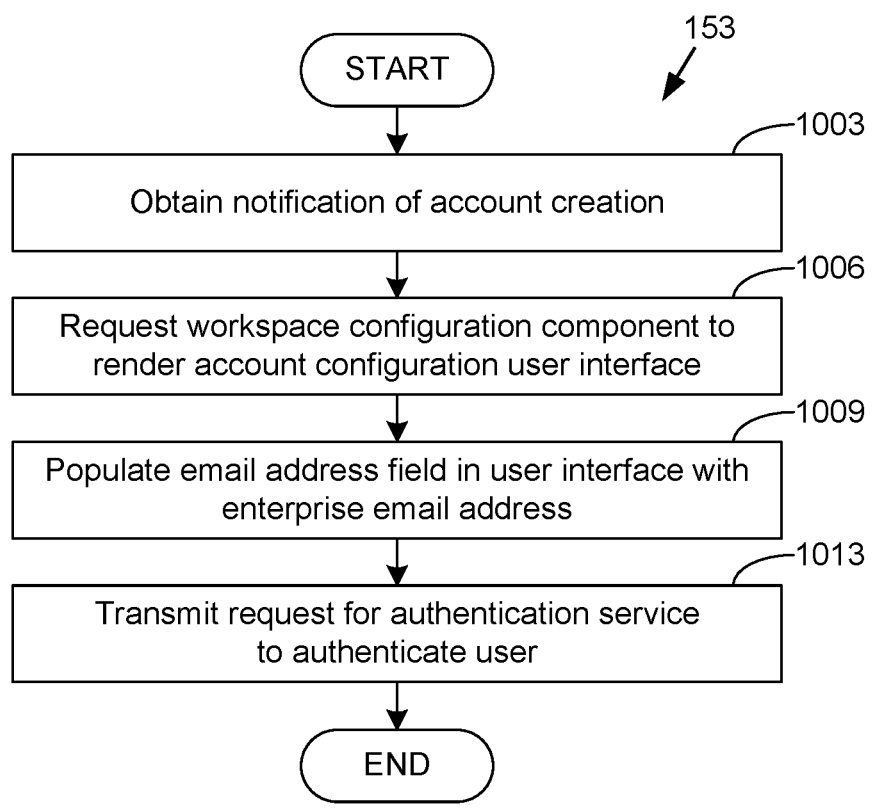
FIG. 10 is a flowchart illustrating another example of functionality implemented by an enterprise management component.

With reference to FIG. 10, shown is a flowchart that provides an example of a portion of the operation of the enterprise management component 153. In particular, FIG. 10 provides an example of the enterprise management component 153 causing a user account 163 to be associated with the enterprise workspace 146. The flowchart of FIG. 10 can be viewed as depicting an example of a method implemented in the client device 106.

To begin, the enterprise management component 153 can obtain a notification that the user account 163 has been created, as shown at step 1003. As described above, the management service 116 or the user account manager 159 can provide the notification to the enterprise management component 153.

At step 1006, the enterprise management component 153 can then request the workspace configuration component 139 to render the user interface for configuring the enterprise workspace 146. As described above, the user interface can include a field for inputting an email address associated with a user account 163. At step 1009, the enterprise management component 153 can populate the email address field with the enterprise email address for the user account 163 created for the user of the client device 106. In other examples, a user can input the enterprise email address.

Then, as shown at step 1013, the enterprise management component 153 can transmit a request for the authentication service 123 to authenticate the user. In some examples, the request can include an API call to the authentication service 123. Thereafter, the process can end.

Figure 11:
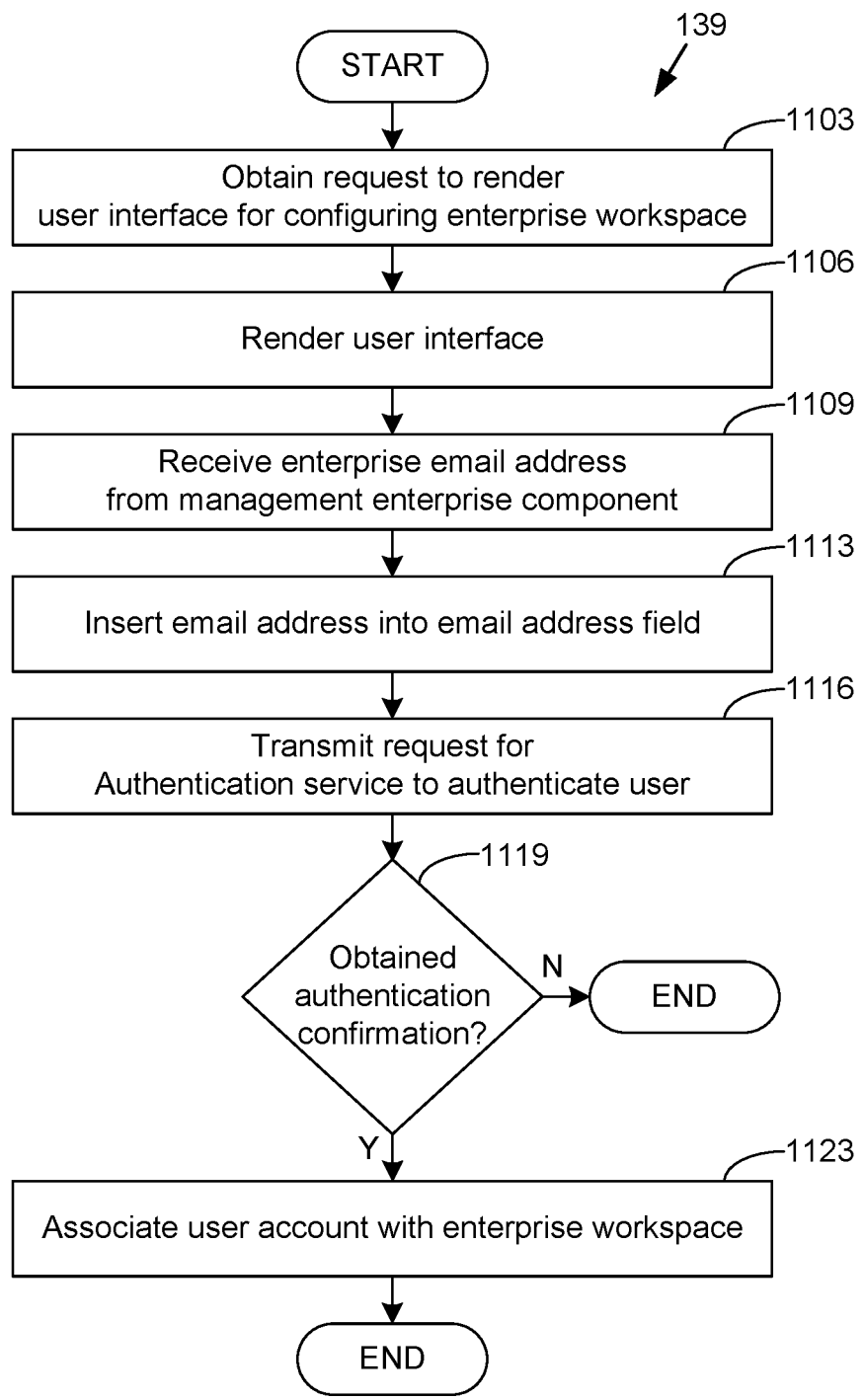
FIG. 11 is a flowchart illustrating another example of functionality implemented by a workspace configuration component.

With reference to FIG. 11, shown is a flowchart that provides an example of a portion of the operation of the workspace configuration component 139. In particular, FIG. 1 provides an example of the workspace configuration component 139 associating a user account 163 with the enterprise workspace 146. The flowchart of FIG. 11 can be viewed as depicting an example of a method implemented in the client device 106.

Beginning with step 1103, the workspace configuration component 139 can obtain a request to render a user interface for configuring the enterprise workspace 146. As described above, the user interface can include a field for inputting an email address associated with a user account 163. The request to render the user interface can be provided by the enterprise management component 153. At step 1106, the workspace configuration component 139 can render the user interface.

Then, as shown at step 1109, the workspace configuration component 139 can receive, from the enterprise management component 153, the enterprise email address associated with the user account 163 for the user of the client device 106. In other examples, the user of the client device 106 can input the enterprise email address. The workspace configuration component 139 can then insert the enterprise email address into the email address field of the rendered user interface, as shown at step 1113.

The workspace configuration component 139 can then transmit a request for the authentication service 123 to authenticate the user of the client device 106, as indicated at step 1116. As described above, the authentication service 123 can include a SAML endpoint that can authenticate the user based on authentication data previously provided by the user.

At step 1119, the workspace configuration component 139 can determine whether it obtained a confirmation that the authentication service 123 authenticated the user. If not, the process can end as shown. Otherwise, if the workspace configuration component 139 obtained an authentication confirmation, the workspace configuration component 139 can move to step 1123 and associate the user account 163 with the enterprise workspace 146. As a result, components in the enterprise workspace 146 can access various services, such as the component repository 156 provided by the operating system distributor computing environment 109. Thereafter, the process can end as shown.

The sequence diagrams and flowcharts discussed above show examples of the functionality and operation of implementations of components described herein. The components of the networked environment 100 described herein can be embodied in hardware, software, or a combination of hardware and software. If embodied in software, each step in the sequence diagrams and flowcharts can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103 and client device 106 can include at least one processing circuit. Such a processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, at least portions of the management service 116, directory service 119, activation component 149 and enterprise management component 153 can be stored in one or more storage devices and be executable by one or more processors. Also, the enterprise data store 126 can be located in the one or more storage devices.

Components described herein can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A system, comprising:
a computing device comprising an operating system that provides a personal workspace and an enterprise workspace;
a storage device storing a plurality of computer instructions executable by the computing device, wherein the plurality of computer instructions cause the computing device to at least:
enroll the computing device with a management service that controls operation of at least a portion of the computing device, the management service being executed remotely from the computing device and accessible by the computing device over a network;
obtain an email address of a user associated with the computing device;
cause the management service to create a first user account of the user with a distributor of the operating system based on the email address in response to determining that the email address is not already associated with an account with the distributor of the operating system, the first user account being created by transmitting an application programming interface (API) call using an API provided by the distributor of the operating system, the API call specifying that a user name of the first user account is the email address, and the first user account being required for access to a service and a component repository provided by distributor of the operating system;
request an authentication service associated with the management service to authenticate the user based on a second user account of the user within a directory service associated with the enterprise workspace, the authentication service authenticating the user according to at least one of: a previous authentication of the user based on an enterprise email address and a password for the management service or authentication information based on the enterprise email address and a password for the management service provided by the user; and
associate the first user account with the enterprise workspace of the computing device.

2. The system of claim 1, wherein the authentication service comprises a security assertion markup language (SAML) authentication service.

3. The system of claim 2, wherein the plurality of computer instructions further cause the computing device to at least notify the distributor of the operating system that authentication of the user is to be performed by the authentication service.

4. The system of claim 1, wherein the plurality of computer instructions further cause the computing device to at least:
generate an account configuration user interface for the enterprise workspace; and
populate an email address field in the account configuration user interface without obtaining an input for the email address field from the user.

5. The system of claim 1, wherein the plurality of computer instructions further cause the computing device to at least obtain an authentication confirmation from the authentication service prior to associating the first user account with the enterprise workspace of the computing device.

6. The system of claim 1, wherein the plurality of computer instructions further cause the computing device to at least cause an activation component in the personal workspace to be uninstalled.

7. The system of claim 1, wherein the plurality of computer instructions further cause the computing device to at least receive a notification that the first user account is created.

8. A non-transitory computer-readable medium storing a plurality of computer instructions executable by a computing device, wherein the plurality of computer instructions cause the computing device to at least:
enroll the computing device with a management service that controls operation of at least a portion of the computing device, the management service being executed remotely from the computing device and accessible by the computing device over a network;
obtain an email address of a user associated with the computing device;
cause the management service to create a first user account of the user with a distributor of an operating system for the computing device based on the email address in response to determining that the email address is not already associated with an account with the distributor of the operating system, the first user account being created by transmitting an application programming interface (API) call using an API provided by the distributor of the operating system, the API call specifying that a user name of the first user account is the email address, and the first user account being required for access to a service and a component repository provided by distributor of the operating system;
request an authentication service associated with the management service to authenticate the user based on a second user account of the user within a directory service associated with an enterprise workspace, the authentication service authenticating the user according to at least one of: a previous authentication of the user based on an enterprise email address and a password for the management service or authentication information based on the enterprise email address and a password for the management service provided by the user; and associate the first user account with the enterprise workspace of the computing device.

9. The non-transitory computer-readable medium of claim 8, wherein the authentication service comprises a security assertion markup language (SAML) authentication service.

10. The non-transitory computer-readable medium of claim 8, wherein the plurality of computer instructions further cause the computing device to at least notify the distributor of the operating system that authentication of the user is to be performed by the authentication service.

11. The non-transitory computer-readable medium of claim 8, wherein the plurality of computer instructions further cause the computing device to at least:
generate an account configuration user interface for the enterprise workspace; and
populate an email address field in the account configuration user interface without obtaining an input for the email address field from the user.

12. The nom-transitory computer-readable medium of claim 8, wherein the plurality of computer instructions further cause the computing device to at least obtain an authentication confirmation from the authentication service prior to associating the first user account with the enterprise workspace of the computing device.

13. The non-transitory computer-readable medium of claim 8, wherein the plurality of computer instructions further cause the computing device to at least cause an activation component in a personal workspace to be uninstalled.

14. The non-transitory computer-readable medium of claim 8, wherein the plurality of computer instructions further cause the computing device to at least notify the management service whether the operating system comprises the enterprise workspace.

15. A method, comprising:
enrolling a computing device with a management service that controls operation of at least a portion of the computing device, the management service being executed remotely from the computing device and accessible by the computing device over a network;
obtaining an email address of a user associated with the computing device;
causing the management service to create a first user account of the user with a distributor of an operating system for the computing device based on the email address in response to determining that the email address is not already associated with an account with the distributor of the operating system, the first user account being created by transmitting an application programming interface (API) call using an API provided by the distributor of the operating system, the API call specifying that a user name of the first user account is the email address, and the first user account being required for access to a service and a component repository provided by distributor of the operating system;
requesting an authentication service associated with the management service to authenticate the user based on a second user account of the user within a directory service associated with an enterprise workspace, the authentication service authenticating the user according to at least one of: a previous authentication of the user based on an enterprise email address and a password for the management service or authentication information based on the enterprise email address and a password for the management service provided by the user; and
associating the first user account with the enterprise workspace of the computing device.

16. The method of claim 15, wherein the authentication service comprises a security assertion markup language (SAML) authentication service.

17. The method of claim 15, further comprising notifying the distributor of the operating system that authentication of the user is to be performed by the authentication service.

18. The method of claim 15, further comprising:
generating an account configuration user interface for the enterprise workspace; and
populating an email address field in the account configuration user interface without obtaining an input for the email address field from the user.

19. The method of claim 15, further comprising obtaining an authentication confirmation from the authentication service prior to associating the first user account with the enterprise workspace of the computing device.

20. The method of claim 15, further comprising causing an activation component in a personal workspace to be uninstalled.

* * * * *